US012323251B2

(12) United States Patent
Saito et al.

(10) Patent No.: US 12,323,251 B2
(45) Date of Patent: Jun. 3, 2025

(54) WIRELESS COMMUNICATION DEVICE, WIRELESS COMMUNICATION BASE STATION, AND WIRELESS COMMUNICATION METHOD

(71) Applicant: JVCKENWOOD Corporation, Yokohama (JP)

(72) Inventors: Yoshinori Saito, Yokohama (JP); Tomonori Nagahama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 393 days.

(21) Appl. No.: 17/899,669

(22) Filed: Aug. 31, 2022

(65) Prior Publication Data

US 2022/0407626 A1   Dec. 22, 2022

Related U.S. Application Data

(63) Continuation of application No. PCT/JP2021/008621, filed on Mar. 5, 2021.

(30) Foreign Application Priority Data

Mar. 17, 2020   (JP) ................. 2020-046827

(51) Int. Cl.
*H04L 1/1803*   (2023.01)
*H04L 1/20*   (2006.01)
*H04W 4/10*   (2009.01)

(52) U.S. Cl.
CPC ............ *H04L 1/1803* (2013.01); *H04L 1/203* (2013.01); *H04W 4/10* (2013.01)

(58) Field of Classification Search
CPC ..... H04L 1/1803; H04L 1/203; H04L 1/0007; H04L 1/0014; H04L 65/4061;

(Continued)

(56) References Cited

U.S. PATENT DOCUMENTS

2012/0063301 A1*   3/2012   Schel ............... H04W 36/26
370/225

FOREIGN PATENT DOCUMENTS

JP            3066311      7/2000
KR       20040000582   *  1/2004

OTHER PUBLICATIONS

International Search Report and Written Opinion for International Application No. PCT/JP2021/008621 mailed on Apr. 13, 2021, 16 pages.

* cited by examiner

*Primary Examiner* — Sudesh M Patidar
(74) *Attorney, Agent, or Firm* — Amin, Turocy & Watson, LLP

(57) ABSTRACT

A wireless communication device comprising a communication unit, a storage, an operation unit, a communication quality measuring unit, and a controller that controls the communication unit and the storage, wherein the controller further controls the storage to store, when the operation unit detects a transmission starting operation during every channel frequency is used by other wireless communication devices, the voice data until the operation unit detects a transmission stopping operation; controls the communication unit to transmit, when every channel frequency is not used and the bit error rate is smaller than a first threshold, all pieces of voice data that have not been transmitted, and to transmit, when every channel frequency is not used and the bit error rate is between the first threshold and a second threshold, a piece of divided data having a predetermined length from a head of the voice data which has not been transmitted.

3 Claims, 26 Drawing Sheets

(58) Field of Classification Search
CPC .......... H04L 65/80; H04W 4/10; H04W 4/02; Y02D 30/70; H04M 3/2236; H04M 3/568; H04M 1/72454
See application file for complete search history.

FIG.15A
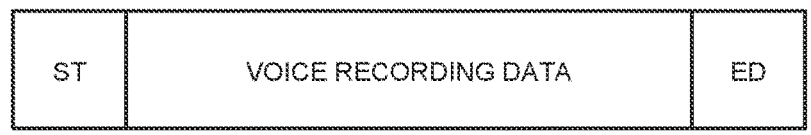
FIG.15B
 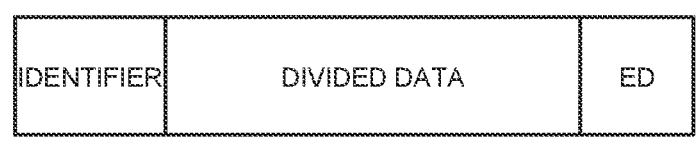

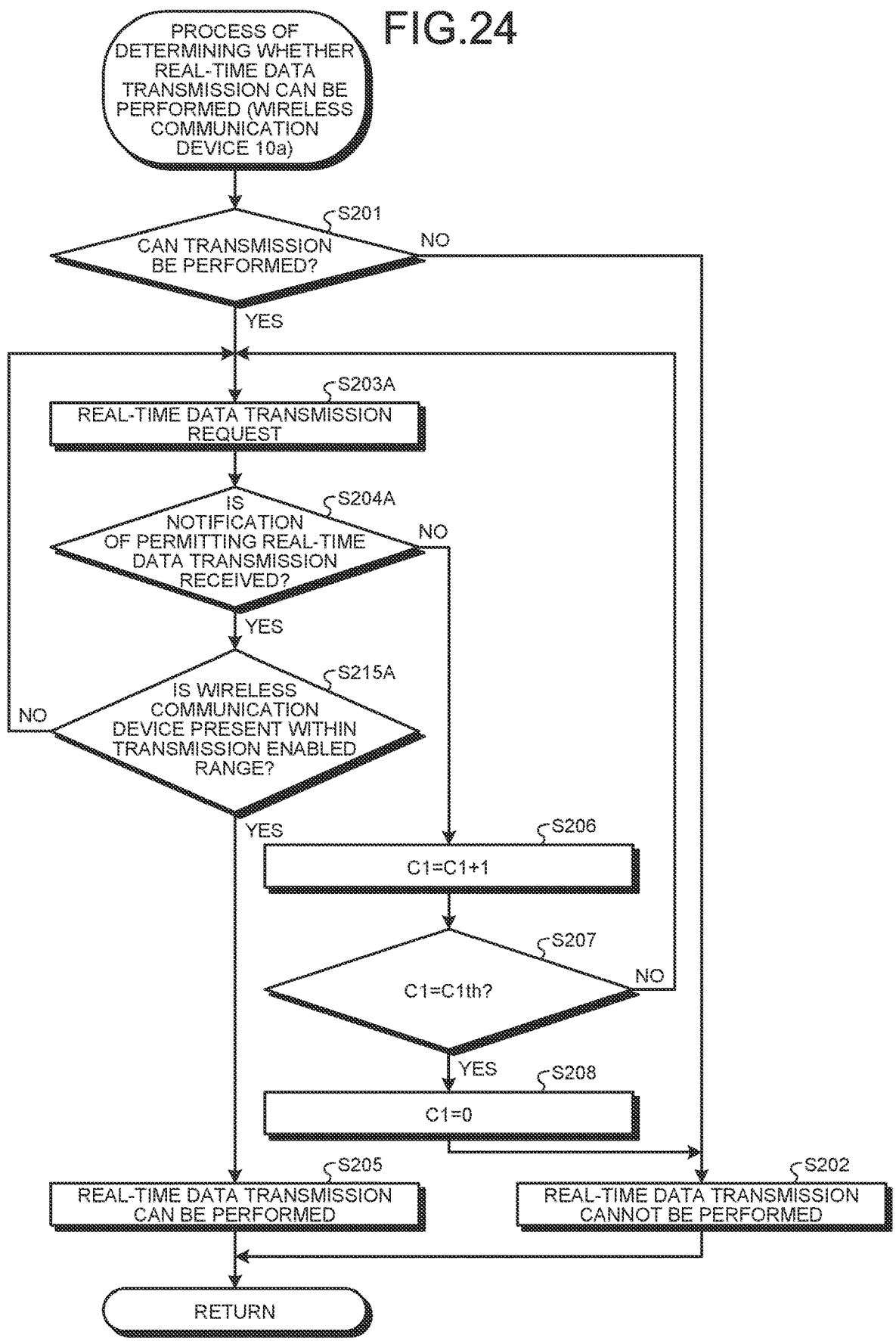

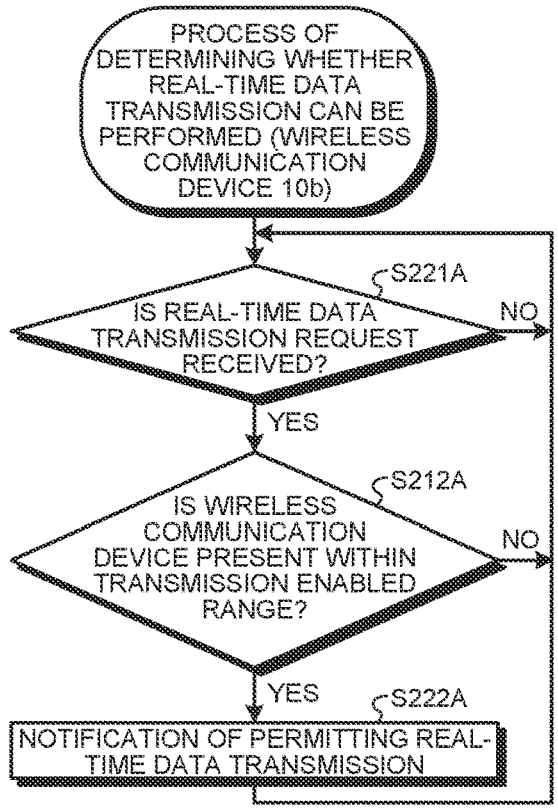
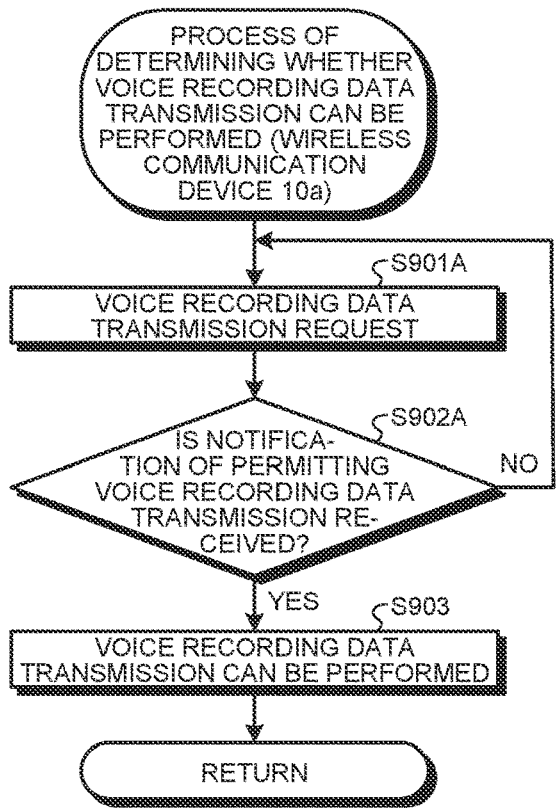

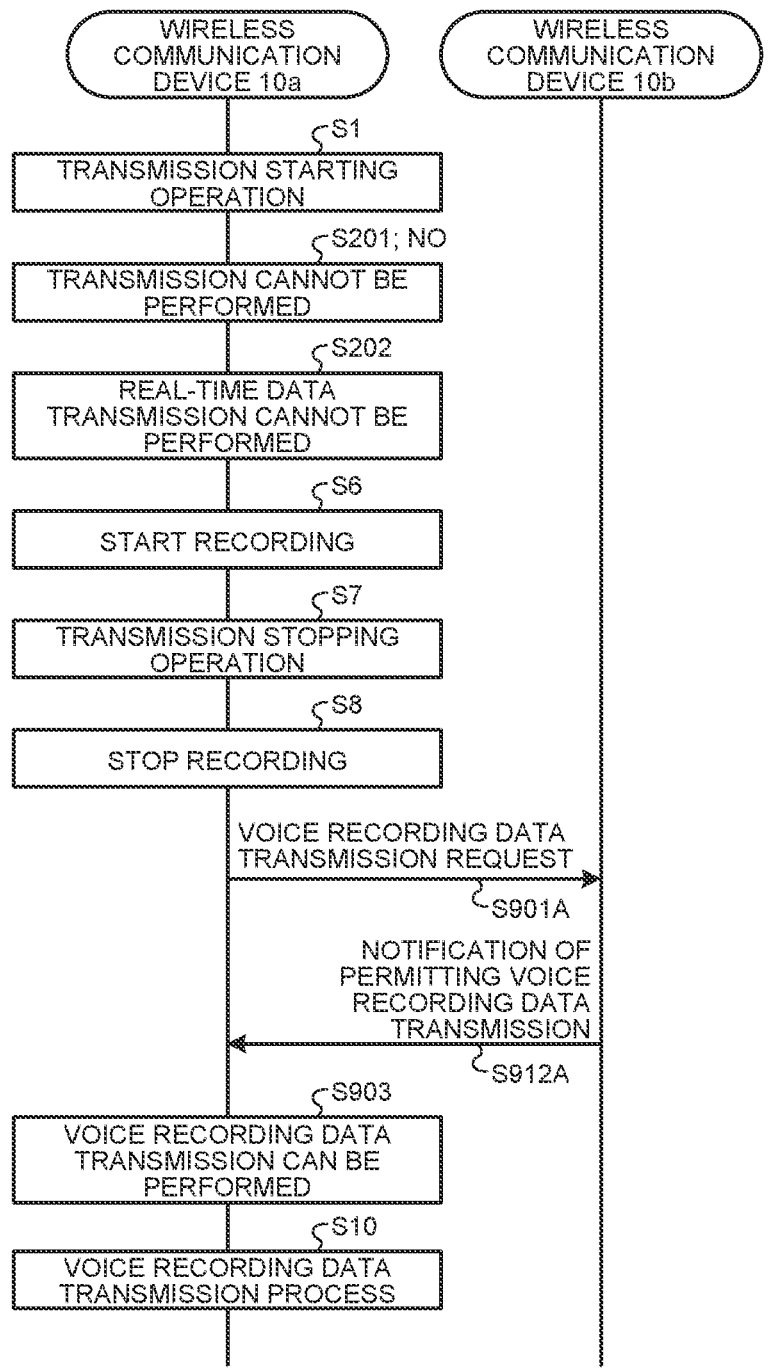

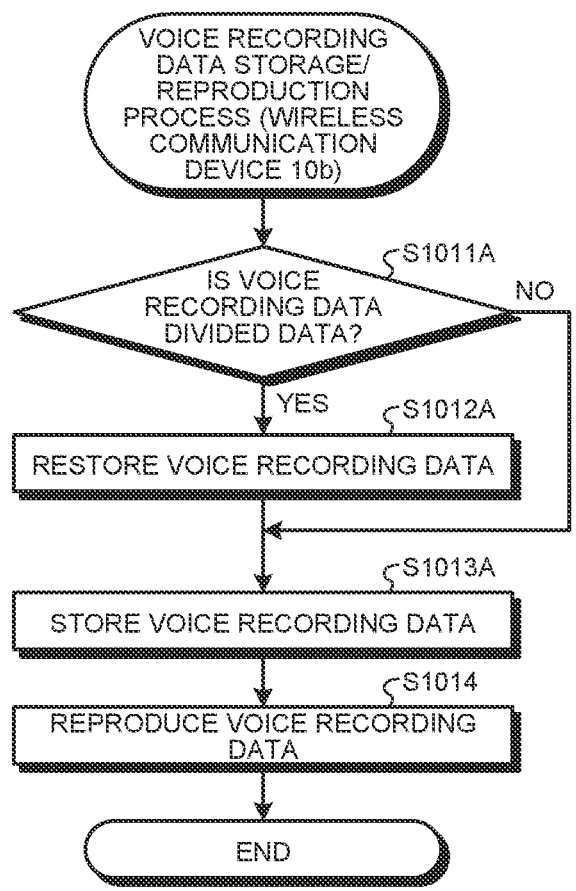

WIRELESS COMMUNICATION DEVICE, WIRELESS COMMUNICATION BASE STATION, AND WIRELESS COMMUNICATION METHOD

CROSS-REFERENCE TO RELATED APPLICATIONS

This application is a Continuation of PCT International Application No. PCT/JP2021/008621 filed on Mar. 5, 2021 which claims the benefit of priority from Japanese Patent Application No. 2020-046827 filed on Mar. 17, 2020, the entire contents of both of which are incorporated herein by reference.

FIELD

The present application relates to a wireless communication device, a wireless communication base station, and a wireless communication method.

BACKGROUND

In a case in which a wireless communication terminal cannot perform transmission in a wireless communication system, there is known a technique of stopping normal transmission, recording transmission content in a memory, and then, when transmission is enabled thereafter, reproducing the transmission content recorded in the memory at high speed until the recorded transmission content catches up current transmission content to enable a smooth conversation without a lack of transmission content (for example, Japanese Patent No. 3066311).

In Japanese Patent No. 3066311, a wireless communication base station monitors transmission signal strength from a wireless communication terminal, determines whether the wireless communication terminal is present within a service area thereof, and when the wireless communication terminal is out of the service area of the wireless communication base station, a wireless line control station transmits a transmission disabled signal to the wireless communication terminal via the wireless communication base station. That is, the technique disclosed in Patent Literature 1 has been developed assuming duplex communication (bidirectional communication) by which a radio wave condition can be monitored even during transmission. In the technique disclosed in Patent Literature 1, in a case in which a transmission disabled period from when transmission is disabled until transmission is enabled is prolonged, and a temporal delay caused in the transmission disabled period cannot be eliminated, the transmission content recorded in the memory needs to be cleared, that is, the transmission content in the transmission disabled period needs to be discarded.

On the other hand, for example, in simplex communication for performing unidirectional communication of what is called a Push to Talk (PTT) type while sharing a call channel with another group, when a communication channel used for transmission and reception within one group is used for communication of the another group, transmission cannot be started until communication of the another group is completed even when a user performs a transmission starting operation with a wireless terminal belonging to the one group. Furthermore, for example, when the user performs the transmission starting operation with the wireless terminal belonging to the one group outside a transmission enabled range of the wireless communication base station, there is a possibility that a radio wave intensity sufficient for performing stable transmission and reception cannot be obtained, and content desired to be transmitted cannot be quickly transmitted.

A wireless communication device, a wireless communication base station, and a wireless communication method are disclosed.

SUMMARY

According to one aspect, there is provided a wireless communication device comprising: a communication unit configured to transmit/receive signals to/from another wireless communication device using a channel frequency; a storage configured to store at least voice data collected by a microphone; an operation unit configured to detect a transmission starting operation and a transmission stopping operation; a communication quality measuring unit configured to measure a bit error rate indicating quality of communication using the channel frequency for each predetermined period; and a controller configured to control at least the communication unit and the storage in accordance with the transmission starting operation and the transmission stopping operation, wherein the controller is further configured to; control the storage to store, in a case in which the operation unit detects the transmission starting operation when the channel frequency is used by other wireless communication devices, the voice data until the operation unit detects the transmission stopping operation, control the communication unit to transmit, in a case in which the bit error rate measured by the communication quality measuring unit is smaller than a first threshold when the channel frequency is not used by other wireless communication devices, all pieces of voice data that have not been transmitted of the voice data stored in the storage, and control the communication unit to transmit, in a case in which the bit error rate is equal to or larger than the first threshold and smaller than a second threshold when the channel frequency is not used by other wireless communication devices, pieces of divided data having a predetermined length from a head of the voice data which has not been transmitted of the voice data stored in the storage.

According to one aspect, there is provided a wireless communication base station configured to relay communication among multiple wireless communication devices, the wireless communication base station comprising: a communication unit configured to transmit/receive signals to/from the wireless communication devices; a storage in which at least a transmission enabled range of the wireless communication base station is stored; a determination unit configured to determine whether each of the wireless communication devices is present within the transmission enabled range based on positional information of each of the wireless communication devices received by the communication unit; and a controller configured to control at least the communication unit and the storage in accordance with a determination result obtained by the determination unit, wherein the controller is further configured to; perform control, in a case in which the wireless communication base station relays voice data that is transmitted from one wireless communication device to another wireless communication device of the wireless communication devices and the voice data transmitted from the one communication device is divided into multiple pieces of divided data, to successively combine the multiple pieces of divided data on a time-series basis, and to restore the voice data transmitted from the one wireless communication device to be stored in the storage, and control the communication unit, in a case in which the another wireless communication device is present within the transmission enabled range, to transmit the voice data stored in the storage to the another wireless communication device.

According to one aspect, there is provided a wireless communication method comprising: storing voice data in a wireless communication device until a transmission stopping operation is detected after a transmission starting operation is detected when a channel frequency used for communication is used by other wireless communication devices; measuring a bit error rate indicating quality of communication using the channel frequency for each predetermined period; transmitting, in a case in which the bit error rate is smaller than a first threshold when the channel frequency is not used by other wireless communication devices, all pieces of voice data that have not been transmitted of the stored voice data; and transmitting, in a case in which the bit error rate is equal to or larger than the first threshold and smaller than a second threshold when the channel frequency is not used by other wireless communication devices, pieces of divided data having a predetermined length from a head of the voice data that has not been transmitted of the stored voice data.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 15A is a schematic diagram of voice recording data stored in a storage of the wireless communication device;

FIG. 15B is a schematic diagram of divided data illustrating a division example of the voice recording data transmitted from a communication unit of the wireless communication device;

FIG. 24 is a flowchart illustrating an example of a procedure for a process of determining whether real-time data transmission can be performed by a transmission side device;

FIG. 25 is a flowchart illustrating an example of a procedure for a process of determining whether real-time data transmission can be performed by a reception side device;

FIG. 26 is a flowchart illustrating an example of a procedure for a process of determining whether voice recording data transmission can be performed by the transmission side device;

FIG. 29 is a sequence diagram illustrating a specific example of the process performed by the wireless communication system according to the second embodiment of the present application; and FIG. 30 is a flowchart illustrating an example of a procedure for a voice recording data storage/reproduction process performed by the reception side device.

DETAILED DESCRIPTION OF THE PREFERRED EMBODIMENTS

Figure 1:
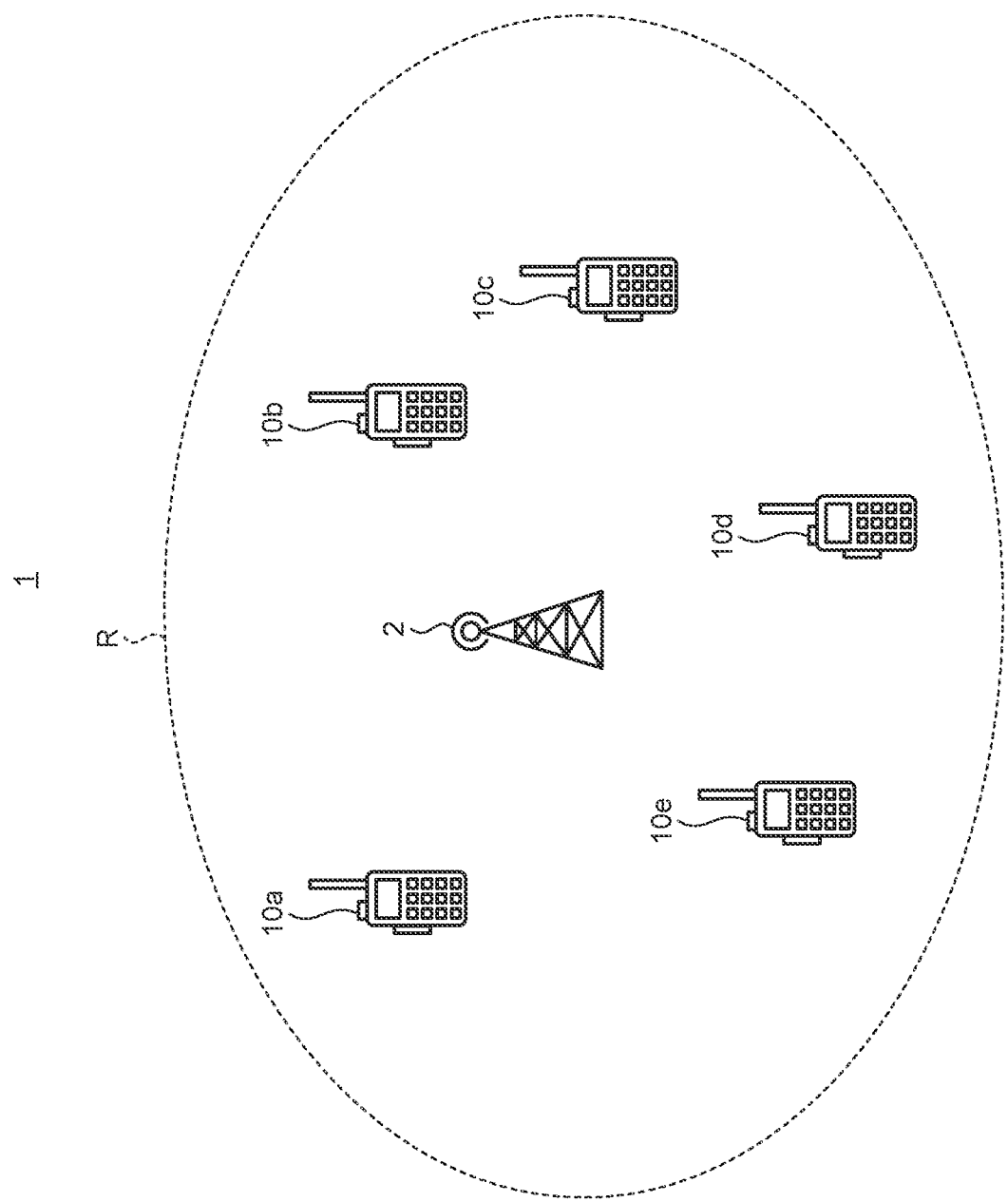
FIG. 1 is a conceptual diagram for explaining a wireless communication system according to a first embodiment of the present application.

The following describes embodiments according to the present application in detail with reference to the attached drawings. The present application is not limited to the embodiments. When there are multiple embodiments, the present application encompasses a combination of the embodiments. In the following embodiments, the same parts are denoted by the same reference numerals, and redundant description will not be repeated.

First Embodiment

<Wireless Communication System>

With reference to FIG. 1, the following describes a configuration of a wireless communication system according to a first embodiment of the present application. FIG. 1 is a conceptual diagram for explaining the configuration of the wireless communication system according to the first embodiment of the present application.

As illustrated in FIG. 1, a wireless communication system 1 according to the first embodiment of the present application includes, for example, a wireless communication device 10a, a wireless communication device 10b, a wireless communication device 10c, a wireless communication device 10d, and a wireless communication device 10e. Each of the wireless communication device 10a to the wireless communication device 10e belongs to the same group. The wireless communication device 10a to the wireless communication device 10e perform group communication with each other by unidirectional communication of a Push to Talk (PTT) type. FIG. 1 illustrates an example in which the wireless communication device 10a to the wireless communication device 10e that perform group communication are present within a transmission enabled range R of a wireless communication base station 2. In the first embodiment of the present application, the transmission enabled range R of the wireless communication base station 2 indicates a range in which a predetermined radio wave intensity required for performing stable transmission/reception between the respective wireless communication devices can be obtained.

The wireless communication device 10a to the wireless communication device 10e perform group communication while appropriately switching between multiple call channels (channel frequencies). The call channels (channel frequencies) used for performing group communication by the wireless communication device 10a to the wireless communication device 10e are shared with another group that is different from the group to which the wireless communication device 10a to the wireless communication device 10e belong. Hereinafter, the wireless communication device 10a to the wireless communication device 10e may be collectively referred to as a wireless communication device 10. The number of the wireless communication devices 10 belonging to the same group is not limited.

<Wireless Communication Device>

Figure 2:
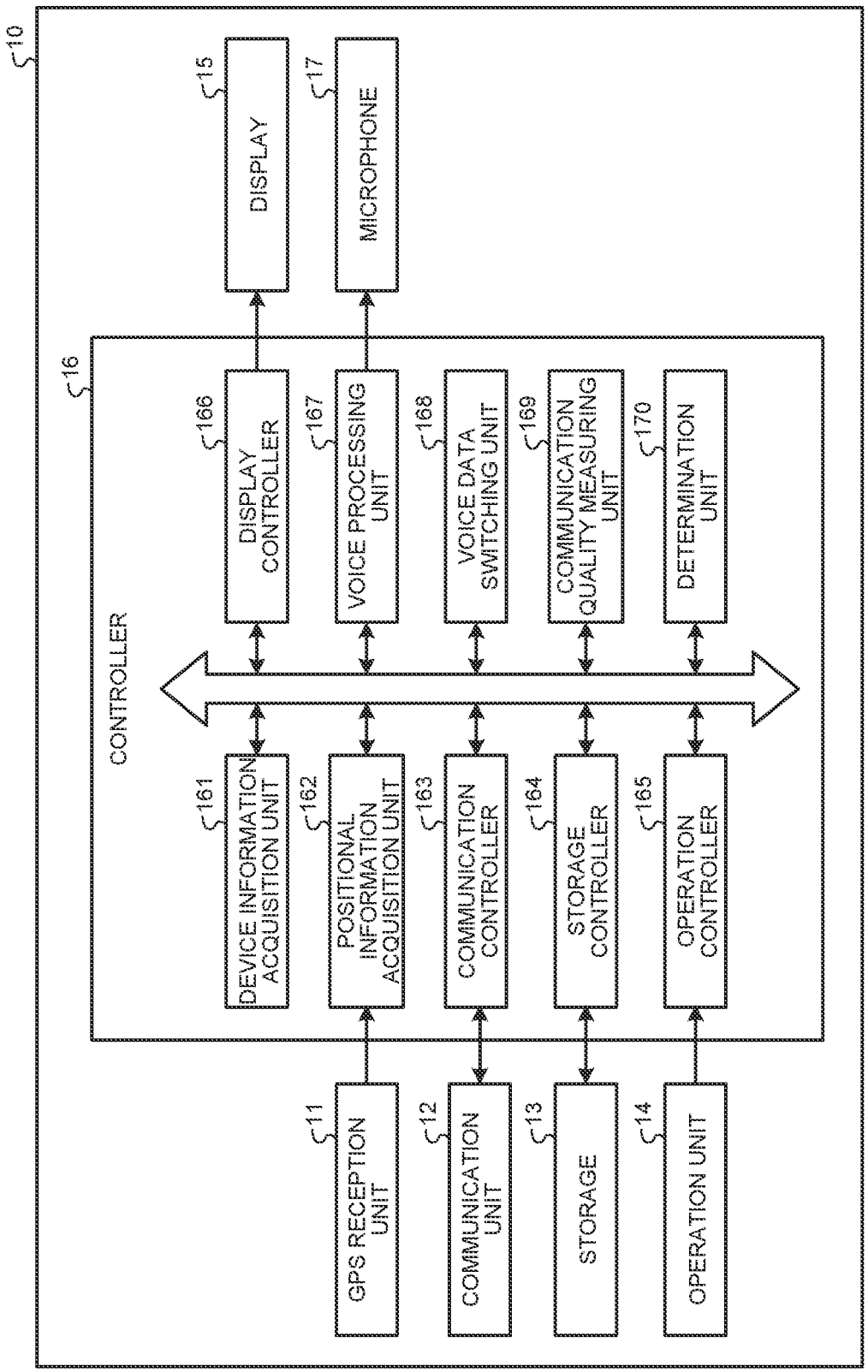
FIG. 2 is a block diagram illustrating an example of a configuration of a wireless communication device according to the first embodiment of the present application.

Next, with reference to FIG. 2, the following describes a configuration of the wireless communication device according to the first embodiment of the present application. FIG. 2 is a block diagram illustrating an example of the configuration of the wireless communication device according to the first embodiment of the present application.

As illustrated in FIG. 2, the wireless communication device 10 includes a GPS reception unit 11, a communication unit 12, a storage 13, an operation unit 14, a display 15, a controller 16, and a microphone 17. The wireless communication device 10 illustrated in FIG. 2 is a wireless communication device having a group communication function by unidirectional communication of PTT type.

The GPS reception unit 11 is constituted of a GPS reception circuit, a GPS reception antenna, and the like, and receives GPS signals. The GPS reception unit 11 outputs the received GPS signals to a positional information acquisition unit 162 (a position measuring unit).

The communication unit 12 performs wireless communication with another wireless communication device by unidirectional communication of PTT type via the wireless communication base station 2. Specifically, the communication unit 12 transmits various pieces of information to the other wireless communication device, and receives various pieces of information from the other wireless communication device. Specifically, the various pieces of information are various kinds of data including voice data, still image data, video data, and document data. In the present application, the voice data may include multiple pieces of divided data that are divided on a time-series basis. A type of data to be transmitted/received to/from the other wireless communication device by the communication unit 12 is not particularly limited. For example, the communication unit 12 may have a function of performing short-range wireless communication, or may have a function of performing long-range wireless communication. Alternatively, the communication unit 12 may perform wireless communication with the other wireless communication device without using the wireless communication base station 2. The communication unit 12 may be constituted of a communication circuit and the like.

The storage 13 stores various pieces of information. For example, the storage 13 stores group information about the group to which the wireless communication device 10 belongs. The group information may include positional information or identification information such as an identification ID of the other wireless communication device belonging to the group, the call channels (channel frequencies) used for the group communication, and the like.

In the present application, the storage 13 stores voice data collected by the microphone 17. Additionally, in the present application, the storage 13 stores thresholds (a first threshold and a second threshold) for a bit error rate (hereinafter, referred to as a "BER") indicating a communication quality index of the communication unit 12. For example, the storage 13 can be implemented by a semiconductor memory element such as a random access memory (RAM) and a flash memory, or a storage device such as a hard disk and a solid state drive.

The operation unit 14 receives various operations for the controller 16. The various operations include, for example, an operation of switching between ON and OFF of a transmission function (a transmission starting operation and a transmission stopping operation in the present application), and an operation of switching between a data transmission state and a data reception state. The operation unit 14 outputs, to an operation controller 165, an operation signal corresponding to a received operation. For example, the operation unit 14 can implement reception of a user's operation by a physical switch or a touch panel disposed on the display 15.

The display 15 displays various images constituting a user interface. In the present application, for example, the display 15 displays information for starting or stopping transmission. The display 15 is, for example, a display including a liquid crystal display (LCD), an organic Electro-Luminescence (EL) display, or the like. The display 15 may include, for example, a light emitting unit such as a light emitting diode (LED).

For example, the controller 16 is implemented when a computer program stored in the storage (for example, a computer program according to the present application, not illustrated) is executed by a central processing unit (CPU), a micro processing unit (MPU), or the like using a RAM or the like as a working area. The controller 16 is a controller which may be implemented by an integrated circuit such as an application specific integrated circuit (ASIC) or a field programmable gate array (FPGA), for example.

The microphone 17 converts, for example, voice input by utterance and the like into a voice signal.

The controller 16 includes a device information acquisition unit 161, the positional information acquisition unit 162, a communication controller 163, a storage controller 164, the operation controller 165, a display controller 166, a voice processing unit 167, a voice data switching unit 168, a communication quality measuring unit 169, and a determination unit 170.

The device information acquisition unit 161 acquires various pieces of information about the other wireless communication device. For example, the device information acquisition unit 161 acquires identification information such as an identification ID, positional information, and the like of the other wireless communication device received by the communication unit 12. The information acquired by the device information acquisition unit 161 is not limited thereto.

The positional information acquisition unit 162 acquires current positional information of the wireless communication device 10. The positional information acquisition unit 162 acquires, for example, the current positional information of the wireless communication device 10 based on GPS signals received by the GPS reception unit 11.

The communication controller 163 controls communication between the wireless communication device 10 and the other wireless communication device 10 belonging to the same group of the wireless communication device 10 by controlling the communication unit 12. The communication controller 163 transmits/receives various kinds of data to/from the other wireless communication device 10 by controlling the communication unit 12, for example. In the present application, the communication controller 163 transmits/receives, for example, voice data collected by the microphone 17 or voice data stored in the storage 13 to/from the other wireless communication device 10 by controlling the communication unit 12.

The storage controller 164 stores various pieces of information in the storage 13. For example, the storage controller 164 stores, in the storage 13, positional information and identification information such as an identification ID of the other wireless communication device acquired by the device information acquisition unit 161, a channel frequency that is currently used by the group, and the like. In the present application, for example, the storage controller 164 stores voice data collected by the microphone 17 in the storage 13.

The storage controller 164 stores, for example, the positional information of the wireless communication device 10 in the storage 13.

The storage controller 164 reads out various pieces of information from the storage 13. For example, the storage controller 164 reads out the identification information such as the identification ID, the positional information, and the like of the other wireless communication device stored in the storage 13. In the present application, the storage controller 164 reads out the voice data stored in the storage 13, for example. For example, the storage controller 164 reads out the positional information of the wireless communication device 10 stored in the storage 13.

The display controller 166 causes the display 15 to display various images. The display controller 166 causes the display 15 to display various images constituting the user interface, for example. In the present application, for example, the display controller 166 causes the display 15 to display information for starting or stopping transmission.

The voice processing unit 167 processes (for example, digitally converts or encrypts) the voice signal collected by the microphone 17, to be output to the voice data switching unit 168 as voice data for transmission.

The voice data switching unit 168 performs a switching process for the voice data. Specifically, the voice data switching unit 168 switches an output destination of the voice data collected by the microphone 17 and processed by the voice processing unit 167, between the communication unit 12 and the storage 13. Additionally, the voice data switching unit 168 switches an output source of the voice data to the communication unit 12 between the voice processing unit 167 and the storage 13.

The communication quality measuring unit 169 measures communication quality of the communication unit 12. Specifically, the communication quality measuring unit 169 measures the BER as the communication quality index of the communication unit 12, for example. A method of measuring the BER by the communication quality measuring unit 169 is not particularly limited.

The determination unit 170 performs various kinds of determination processes in the wireless communication device 10. Specific examples of the determination processes performed by the determination unit 170 will be described later in detail in a process of determining whether real-time data transmission can be performed, a process of determining whether voice recording data transmission can be performed, a voice recording data transmission process, and a voice recording data relay process.

<Wireless Communication Base Station>

Figure 3:
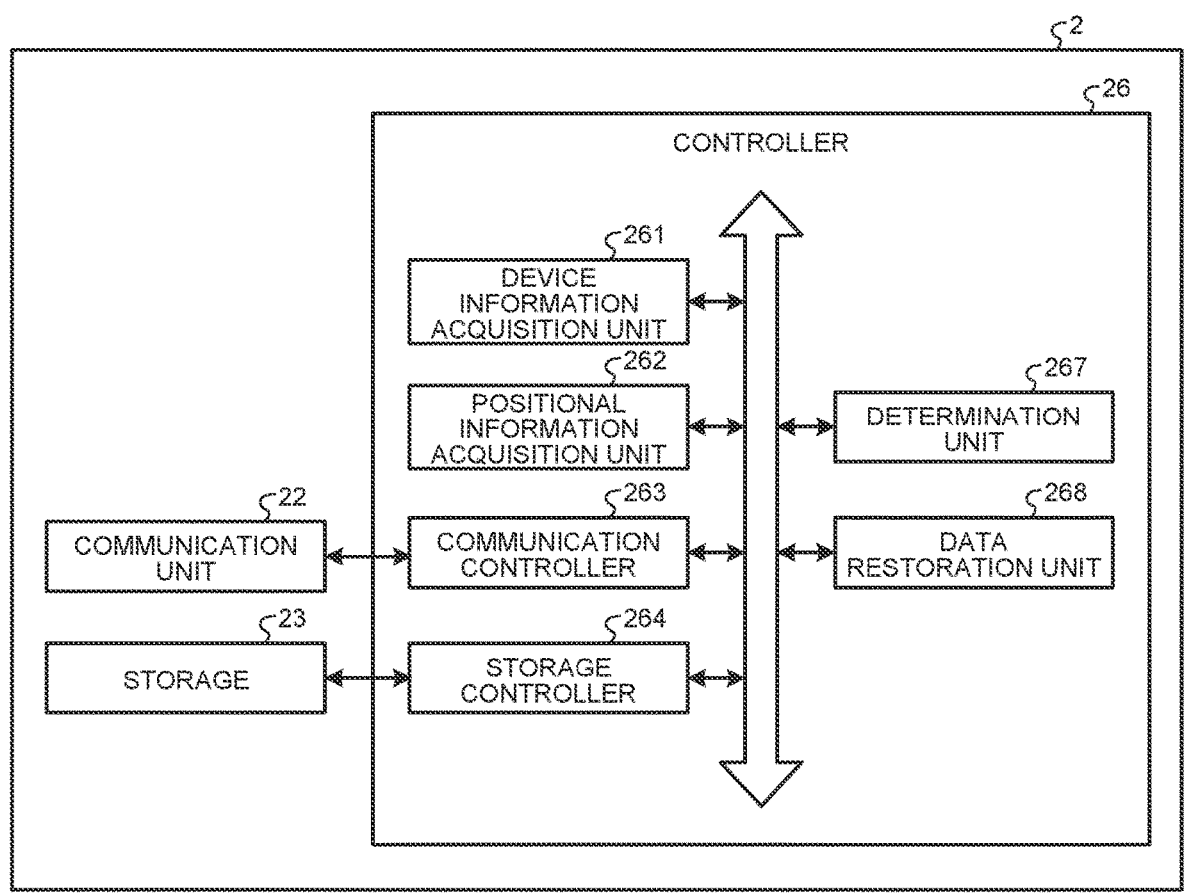
FIG. 3 is a block diagram illustrating an example of a configuration of a wireless communication base station according to the first embodiment of the present application.

Next, with reference to FIG. 3, the following describes a configuration of a wireless communication base station 2 according to the first embodiment of the present application. FIG. 3 is a block diagram illustrating an example of the configuration of the wireless communication base station according to the first embodiment of the present application.

As illustrated in FIG. 3, the wireless communication base station 2 includes a communication unit 22, a storage 23, and a controller 26. The wireless communication base station 2 illustrated in FIG. 3 is a wireless communication base station having a function of relaying unidirectional communication among the wireless communication devices that perform group communication by unidirectional communication of PTT type. Hereinafter, the wireless communication devices that perform group communication by unidirectional communication of PTT type are also referred to as "wireless communication devices in the group".

The wireless communication base station 2 relays group communication among the wireless communication devices in the group while the call channels (channel frequencies) are shared by multiple groups and the call channels (channel frequencies) are appropriately switched.

The communication unit 22 performs wireless communication with the wireless communication devices in the group. Specifically, the communication unit 22 relays various pieces of information transmitted/received among the wireless communication devices in the group.

Specifically, the various pieces of information are various kinds of data including voice data, still image data, video data, and document data. A type of data to be relayed among the wireless communication devices by the communication unit 22 is not particularly limited. In the present application, the communication unit 22 receives positional information of each of the wireless communication devices together with the voice data from each of the wireless communication devices in the group. The communication unit 22 may be constituted of a communication circuit and the like.

The storage 23 stores various pieces of information. For example, the storage 23 stores group information about the group performing group communication. The group information may include positional information or identification information such as an identification ID of each of the wireless communication devices in the group, the call channels (channel frequencies) used for group communication, and the like. In the present application, the storage 23 stores the voice data transmitted/received among the wireless communication devices in the group. The voice data transmitted/received among the wireless communication devices in the group is stored together with the positional information received from each of the wireless communication devices in the group by the communication unit 22. In the present application, the storage 23 stores the transmission enabled range of the wireless communication base station 2 (for example, the transmission enabled range R illustrated in FIG. 1). For example, the storage 23 can be implemented by a semiconductor memory element such as a random access memory (RAM) and a flash memory, or a storage device such as a hard disk and a solid state drive.

For example, the controller 26 is implemented when a computer program stored in the storage (for example, a computer program according to the present application, not illustrated) is executed by a central processing unit (CPU), a micro processing unit (MPU), or the like using a RAM or the like as a working area. The controller 26 is a controller that may be implemented by an integrated circuit such as an application specific integrated circuit (ASIC) or a field programmable gate array (FPGA), for example.

The controller 26 includes a device information acquisition unit 261, a positional information acquisition unit 262, a communication controller 263, a storage controller 264, a determination unit 267, and a data restoration unit 268.

The device information acquisition unit 261 acquires various pieces of information about the wireless communication devices in the group. For example, the device information acquisition unit 261 acquires identification information such as an identification ID and positional information of each of the wireless communication devices in the group received by the communication unit 22, a channel frequency that is currently used by the group, and the like. The information acquired by the device information acquisition unit 261 is not limited thereto.

The positional information acquisition unit 262 acquires current positional information of each of the wireless communication devices in the group. For example, the positional information acquisition unit 262 acquires the current positional information of the wireless communication device 10 based on information transmitted from each of the wireless communication devices.

The communication controller 263 controls communication among the wireless communication devices in the group by controlling the communication unit 22. For example, the communication controller 263 relays various kinds of data among the wireless communication devices in the group by controlling the communication unit 22. In the present application, for example, the communication controller 263 relays the voice data transmitted from each of the wireless communication devices in the group among the wireless communication devices in the group by controlling the communication unit 22.

The storage controller 264 stores various pieces of information in the storage 23. For example, the storage controller 264 stores, in the storage 23, positional information and identification information such as an identification ID of each of the wireless communication devices in the group acquired by the device information acquisition unit 261, a channel frequency that is currently used by the group, and the like. In the present application, for example, the storage controller 264 stores, in the storage 23, the voice data transmitted from each of the wireless communication devices in the group together with the positional information of each of the wireless communication devices. In the present application, for example, the storage controller 264 stores the positional information of each of the wireless communication devices in the group in the storage 23.

The storage controller 264 reads out various pieces of information from the storage 23. For example, the storage controller 264 reads out the positional information and the identification information such as the identification ID of the other wireless communication device stored in the storage 23, the channel frequency that is currently used by the group, and the like. In the present application, the storage controller 264 reads out the voice data stored in the storage 23, for example. Additionally, in the present application, the storage controller 264 reads out, for example, the transmission enabled range of the wireless communication base station 2, the positional information of each of the wireless communication devices in the group, and the like, which are stored in the storage 23.

The determination unit 267 performs various kinds of determination processes in the wireless communication base station 2. Specifically, for example, the determination unit 267 determines whether each of the wireless communication devices in the group is present within the transmission enabled range of the wireless communication base station 2 (for example, the transmission enabled range R illustrated in FIG. 1). In the present application, for example, the determination unit 267 determines whether each of the wireless communication devices in the group is present within the transmission enabled range of the wireless communication base station 2 based on the transmission enabled range of the wireless communication base station 2 and the positional information of each of the wireless communication devices in the group that are read out from the storage 23. Specific examples of the determination processes performed by the determination unit 267 will be described later in detail in a process of determining whether real-time data transmission can be performed, a process of determining whether voice recording data transmission can be performed, a voice recording data storage process, and a voice recording data relay process (described later).

When the voice data received by the communication unit 22 is divided into multiple pieces of divided data, the data restoration unit 268 combines the multiple pieces of divided data to restore original voice data. Specific examples of a voice data restoration process performed by the data restoration unit 268 will be described later in detail in a voice recording data storage process.

Figure 4:
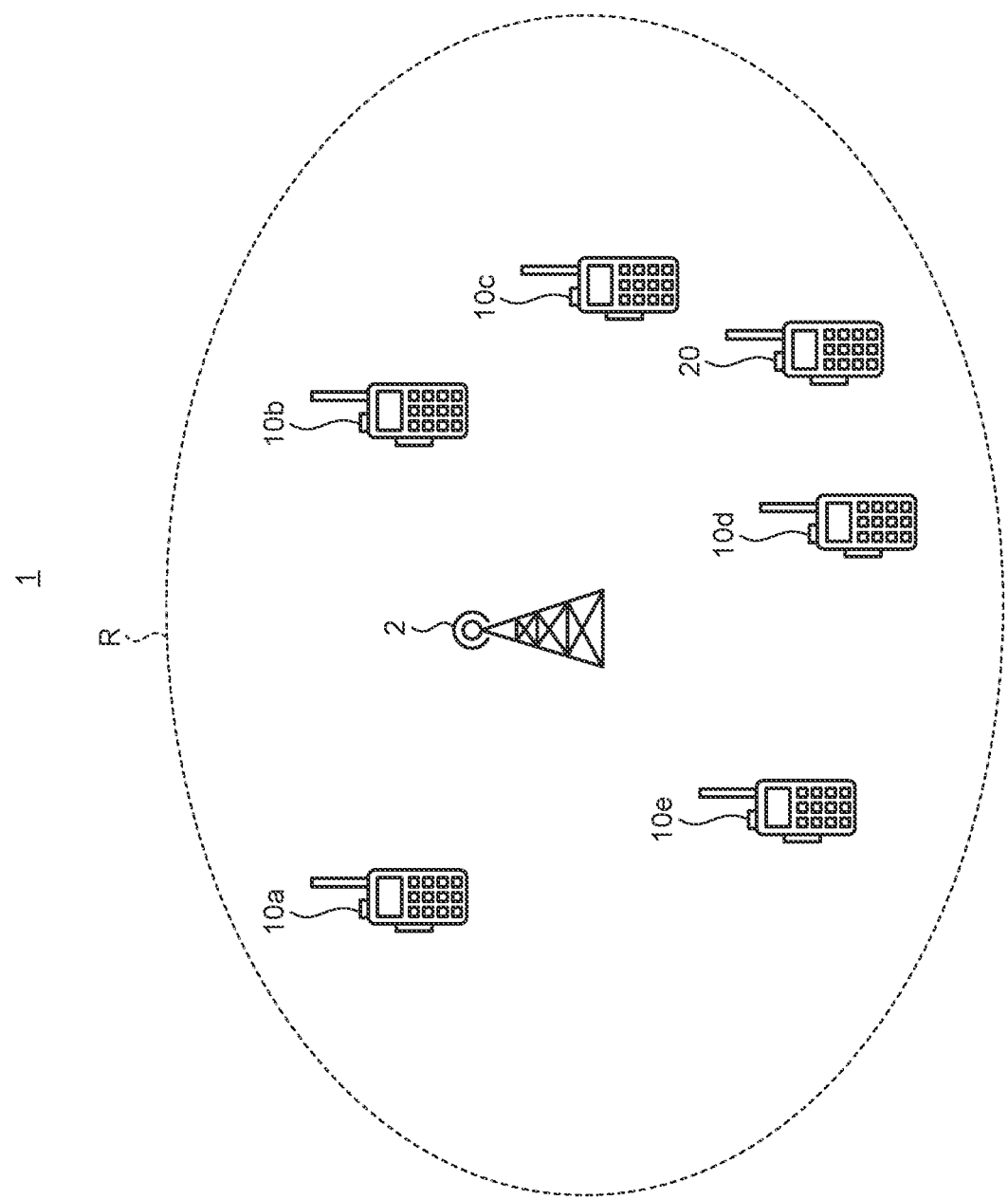
FIG. 4 is a conceptual diagram for explaining a specific example of the wireless communication system according to the first embodiment of the present application.
Figure 5:
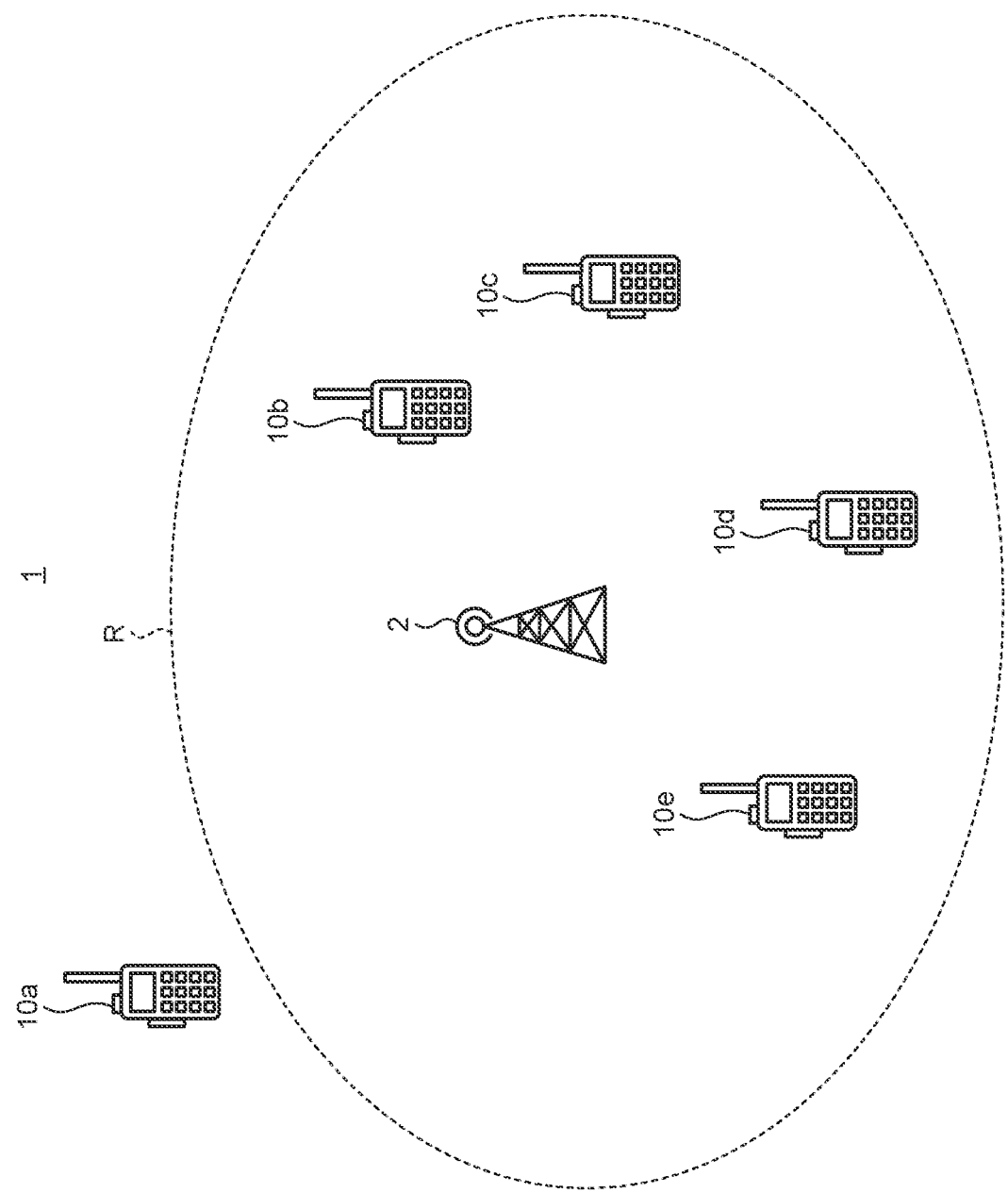
FIG. 5 is a conceptual diagram for explaining a specific example of the wireless communication system according to the first embodiment of the present application.

Next, with reference to FIG. 4 and FIG. 5, the following describes a specific example of the wireless communication system 1 according to the first embodiment of the present application. FIG. 4 and FIG. 5 are conceptual diagrams for explaining the specific example of the wireless communication system according to the first embodiment of the present application.

FIG. 4 illustrates an example in which a wireless communication device 20 belonging to another group different from a group of the wireless communication device 10 is present within the transmission enabled range R of the wireless communication base station 2. The number of the wireless communication devices 20 belonging to the same group is not limited.

FIG. 5 illustrates an example in which, among the wireless communication devices 10 belonging to the same group that perform group communication, the wireless communication device 10a is present outside the transmission enabled range R of the wireless communication base station 2.

In the example illustrated in FIG. 4, for example, even when the user performs the transmission starting operation with the wireless communication device 10a, in a case in which there is no vacant channel in the call channels (channel frequencies) used for group communication of the group to which the wireless communication device 10a belongs, that is, in a case in which all of the call channels (channel frequencies) are used for group communication by another group including the group to which the wireless communication device 20 belongs, the wireless communication device 20 sharing the call channels (channel frequencies) with the group to which the wireless communication device 10a belongs, transmission of the wireless communication device 10a with which the user has performed the transmission starting operation cannot be started until group communication of the another group is completed and a vacant channel is generated in the call channels (channel frequencies).

In the example illustrated in FIG. 5, for example, in a case in which the user performs the transmission starting operation with the wireless communication device 10a that is present outside the transmission enabled range R of the wireless communication base station 2, there is a possibility that a radio wave intensity required for performing stable transmission/reception cannot be obtained and transmission content may be lost.

In this way, with the wireless communication device 10 that shares the call channels (channel frequencies) with another group and performs group communication by unidirectional communication of PTT type via the wireless communication base station 2, for example, there is a possibility that the transmission content cannot be quickly transmitted due to a time lag from when the user performs the transmission starting operation until a vacant channel is generated in the call channels (channel frequencies) and transmission is actually started, or due to lowering of the radio wave intensity caused when the wireless communication device 10 is present outside the transmission enabled range of the wireless communication base station 2, for example.

Figure 6:
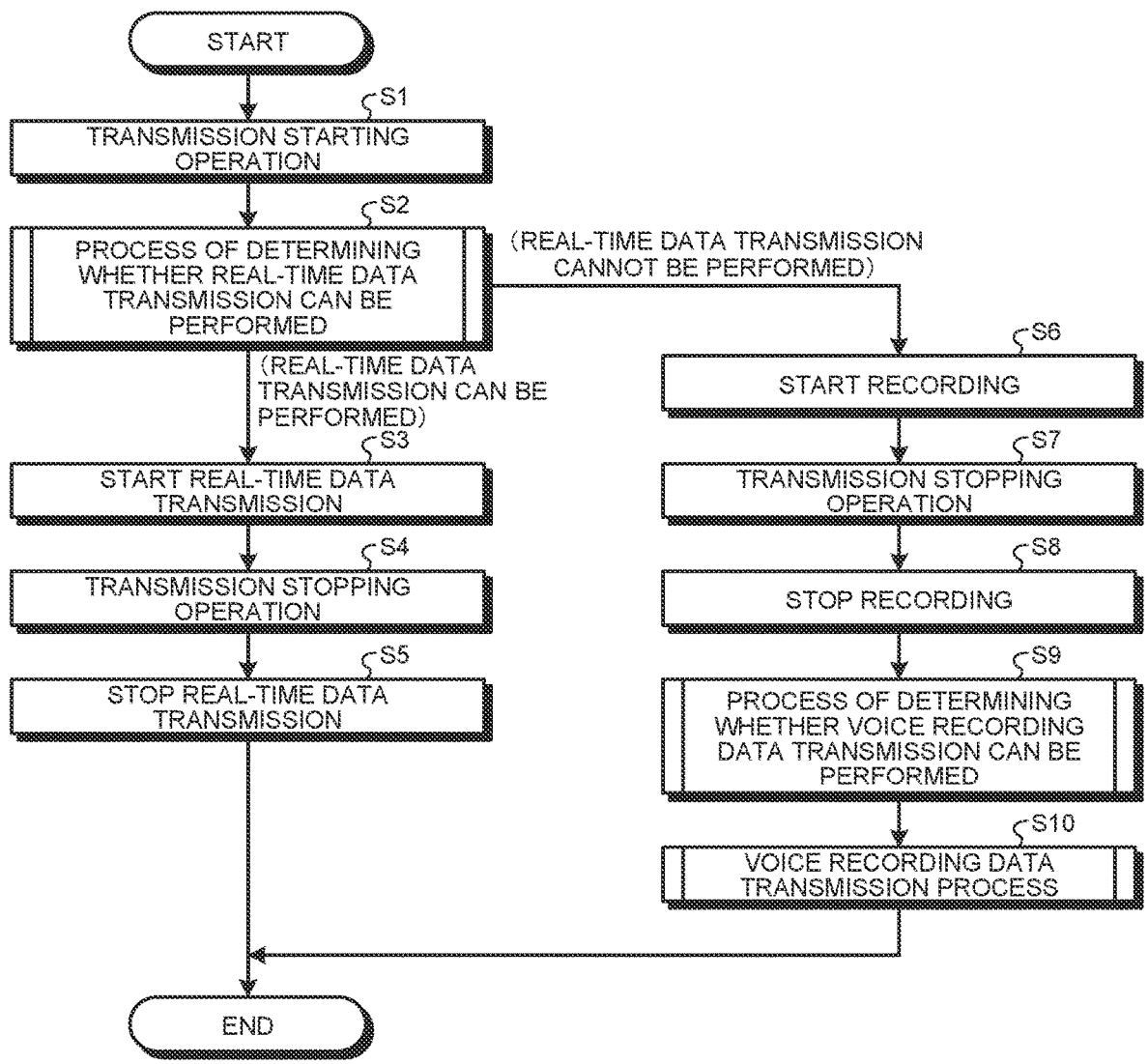
FIG. 6 is a flowchart illustrating an example of a procedure for a schematic process performed by the wireless communication system according to the first embodiment of the present application.

With reference to FIG. 6, the following describes a schematic process performed by the wireless communication system 1 according to the first embodiment of the present application. FIG. 6 is a flowchart illustrating an example of a procedure of a schematic process performed by the wireless communication system according to the first embodiment of the present application. In the following description, the wireless communication device 10a is assumed to be a transmission side device (one wireless communication device) and the wireless communication device 10b is assumed to be a reception side device (another wireless communication device). Regarding the schematic process illustrated in FIG. 6, mainly described is the wireless communication device 10a as the transmission side device.

When the transmission starting operation is performed by the wireless communication device 10a (Step S1), the wireless communication device 10a performs a process of determining whether the voice data collected by the microphone 17 (hereinafter, also referred to as real-time data) can be transmitted (a process of determining whether real-time data transmission can be performed) (Step S2). When the real-time data can be transmitted, the wireless communication device 10a starts real-time transmission of the voice data collected by the microphone 17 (Step S3). When the transmission stopping operation is performed by the wireless communication device 10a (Step S4), the wireless communication device 10a stops the real-time transmission of the voice data collected by the microphone 17 (Step S5).

When the real-time data cannot be transmitted, the wireless communication device 10a starts to record voice data collected by the microphone 17 (Step S6). When the transmission stopping operation is performed by the wireless communication device 10a (Step S7), the wireless communication device 10a stops the recording of the voice data collected by the microphone 17 (Step S8), and performs a transmission process for the voice recording data (a voice recording data transmission process) (Step S10) after a process of determining whether the voice recording data can be transmitted (a process of determining whether voice recording data transmission can be performed) (Step S9).

<Process of Determining Whether Real-Time Data Transmission can be Performed>

Figure 7:
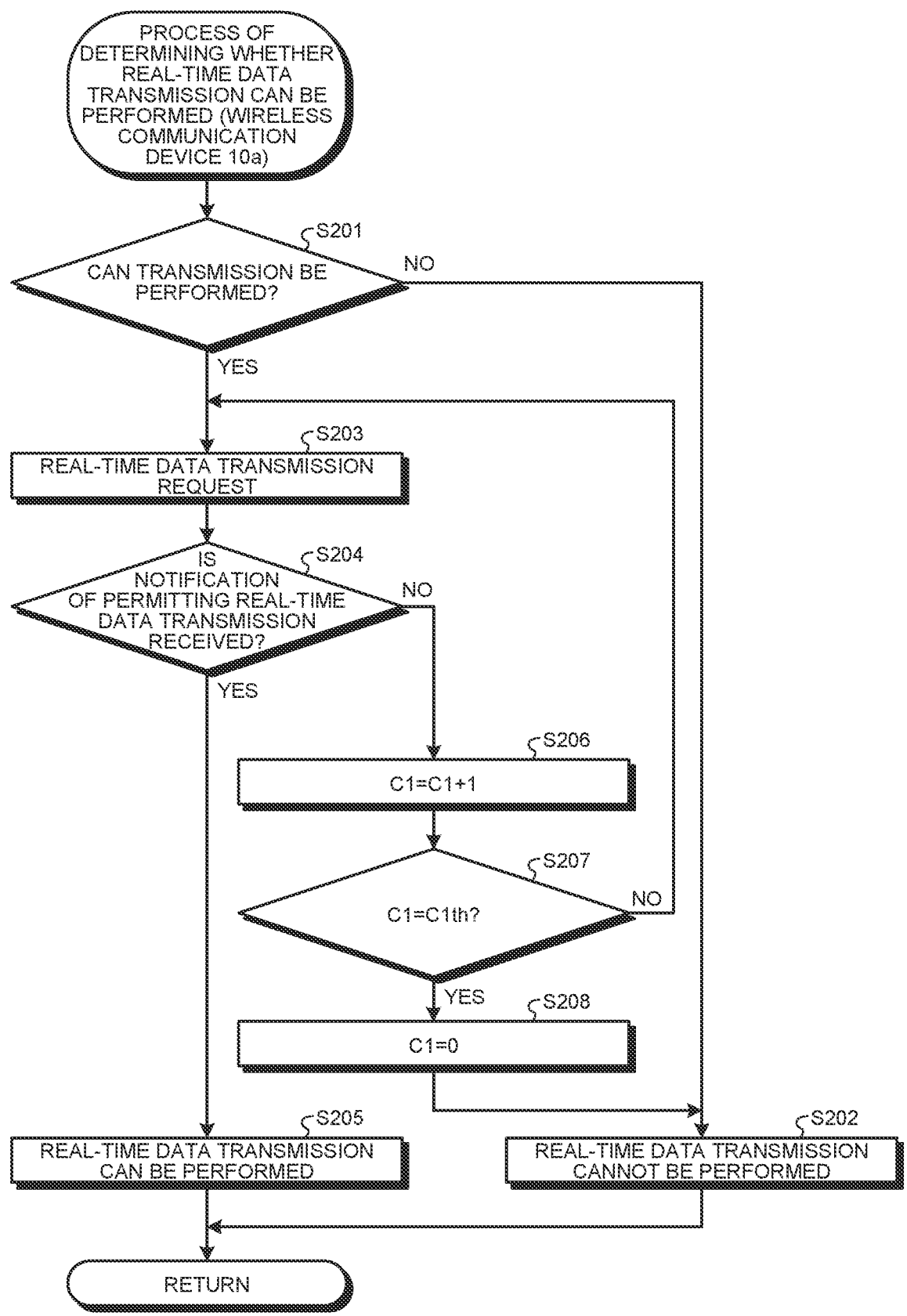
FIG. 7 is a flowchart illustrating an example of a procedure for a process of determining whether real-time data transmission can be performed by a transmission side device.
Figure 8:
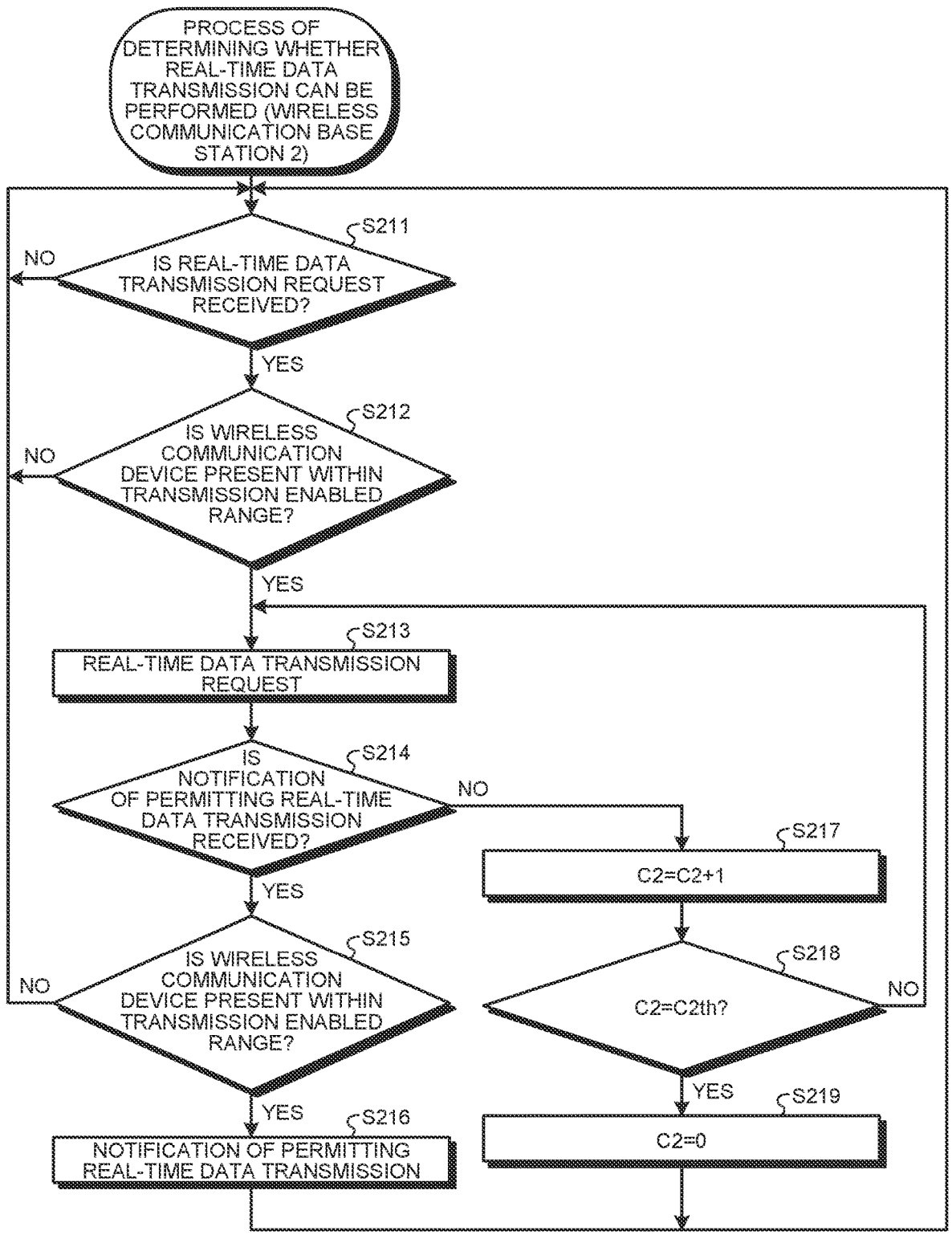
FIG. 8 is a flowchart illustrating an example of a procedure for a process of determining whether real-time data transmission can be performed by the wireless communication base station.
Figure 9:
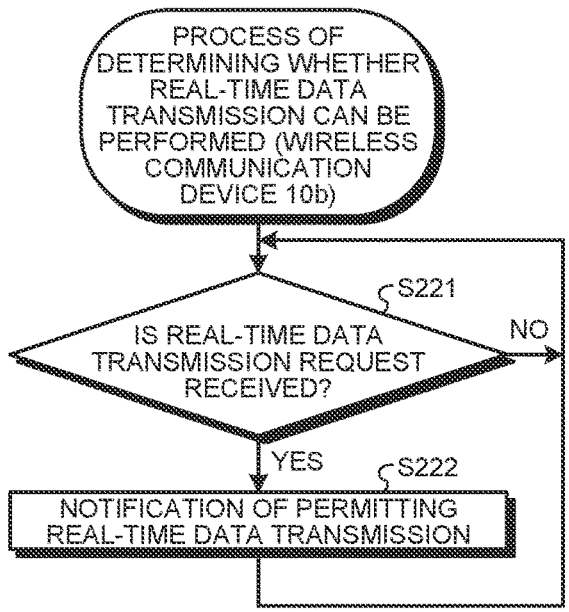
FIG. 9 is a flowchart illustrating an example of a procedure for a process of determining whether real-time data transmission can be performed by a reception side device.

With reference to FIG. 7, FIG. 8, and FIG. 9, the following describes a specific example of the process of determining whether real-time data transmission can be performed (Step S2 illustrated in FIG. 6) by the wireless communication device 10a as the transmission side device, the wireless communication device 10b as the reception side device, and the wireless communication base station 2 that relays communication between the wireless communication device 10a and the wireless communication device 10b. FIG. 7 is a flowchart illustrating an example of a procedure for the process of determining whether real-time data transmission can be performed by the transmission side device. FIG. 8 is a flowchart illustrating an example of a procedure for the process of determining whether real-time data transmission can be performed by the wireless communication base station. FIG. 9 is a flowchart illustrating an example of a procedure for the process of determining whether real-time data transmission can be performed by the reception side device.

In each of pieces of the process illustrated in FIG. 7, FIG. 8, and FIG. 9, the wireless communication device 10a is assumed to be in a detection standby state for the transmission starting operation, the wireless communication base station 2 is assumed to be in a reception standby state for a real-time data transmission request by the wireless communication device 10a, and the wireless communication device 10b is assumed to be in a reception standby state for a real-time data transmission request by the wireless communication base station 2.

When the transmission starting operation is performed by the user by operating the operation unit 14 of the wireless communication device 10a (Step S1 in FIG. 6), first, the determination unit 170 of the wireless communication device 10a determines whether transmission can be performed by the communication unit 12 as illustrated in FIG. 7 (Step S201). Specifically, the determination unit 170 of the wireless communication device 10a acquires a reception state of the communication unit 12, and if there is no received radio wave in one of the call channels (one of the channel frequencies) stored in the storage 13, the determination unit 170 determines that transmission can be performed by using the one of the call channels (the one of the channel frequency) (Yes at Step S201). If there are received radio waves in all of the call channels (channel frequencies) stored in the storage 13, the determination unit 170 of the wireless communication device 10a determines that transmission cannot be performed (No at Step S201).

If transmission cannot be performed (No at Step S201), the determination unit 170 of the wireless communication device 10a determines that real-time data transmission cannot be performed (Step S202).

If transmission can be performed (Yes at Step S201), the communication controller 163 of the wireless communication device 10a controls the communication unit 12 to make a real-time data transmission request to the wireless communication base station 2 (Step S203). At the time of making the real-time data transmission request to the wireless communication base station 2, the wireless communication device 10a may transmit the positional information, the identification information such as the identification ID, and the like thereof. The identification information such as the identification ID, the positional information, and the like thereof may be periodically transmitted. At the time when the wireless communication device 10a makes the real-time data transmission request to the wireless communication base station 2, the determination unit 170 of the wireless communication device 10a may determine whether to make the real-time data transmission request by the radio wave intensity received by the communication unit 12 from the wireless communication base station 2 as an indicator of the determination. Alternatively, the determination unit 170 of the wireless communication device 10a may determine whether to make the real-time data transmission request based on the positional information, a battery residual amount, an average value of a transmission arrival distance, and the like of the wireless communication device 10a.

As illustrated in FIG. 8, the determination unit 267 of the wireless communication base station 2 determines whether the real-time data transmission request by the wireless communication device 10a is received (Step S211). If the real-time data transmission request by the wireless communication device 10a is not received (No at Step S211), the determination unit 267 of the wireless communication base station 2 repeatedly performs the process at Step S211 until the real-time data transmission request by the wireless communication device 10a is received.

If the real-time data transmission request by the wireless communication device 10a is received (Yes at Step S211), subsequently, the determination unit 267 of the wireless communication base station 2 determines whether the wireless communication device 10a is present within the transmission enabled range of the wireless communication base station 2 stored in the storage 23 (Step S212). If the wireless communication device 10a is not present within the transmission enabled range of the wireless communication base station 2 (No at Step S212), the process returns to Step S211, and the wireless communication base station 2 returns to the reception standby state for the real-time data transmission request by the wireless communication device 10a.

If the wireless communication device 10a is present within the transmission enabled range of the wireless communication base station 2 (Yes at Step S212), the communication controller 263 of the wireless communication base station 2 controls the communication unit 12 to make the real-time data transmission request to the wireless communication device 10b (Step S213). At the time of making the real-time data transmission request to the wireless communication device 10b, the wireless communication base station 2 may also make a transmission request for the identification information such as the identification ID, the positional information, and the like of the wireless communication device 10b. At the time when the wireless communication base station 2 makes the real-time data transmission request to the wireless communication device 10b, the determination unit 267 of the wireless communication base station 2 may determine whether to make the real-time data transmission request by the radio wave intensity between the wireless communication device 10b and itself as an indicator of the determination. Alternatively, the determination unit 267 of the wireless communication base station 2 may determine whether to make the real-time data transmission request based on the positional information, a battery residual amount, an average value of a transmission arrival distance, and the like of the wireless communication device 10b received from the wireless communication device 10b.

As illustrated in FIG. 9, the determination unit 170 of the wireless communication device 10b determines whether the real-time data transmission request by the wireless communication base station 2 is received (Step S221). If the real-time data transmission request by the wireless communication base station 2 is not received (No at Step S221), the determination unit 170 of the wireless communication device 10b repeatedly performs the process at Step S221 until the real-time data transmission request by the wireless communication base station 2 is received.

If the real-time data transmission request by the wireless communication base station 2 is received (Yes at Step S221), the communication controller 163 of the wireless communication device 10b controls the communication unit 12 to give a notification of permitting real-time data transmission to the wireless communication base station 2 (Step S222). At the time of giving the notification of permitting real-time data transmission to the wireless communication base station 2, the wireless communication device 10b may transmit the identification information such as the identification ID, the positional information, and the like thereof. The identification information such as the identification ID, the positional information, and the like thereof may be periodically transmitted.

The following describes FIG. 8 again. The determination unit 267 of the wireless communication base station 2 determines whether the notification of permitting real-time data transmission from the wireless communication device 10b is received (Step S214).

If the notification of permitting real-time data transmission from the wireless communication device 10b is not received (No at Step S214), the determination unit 267 of the wireless communication base station 2 adds 1 to a counter value C2 (Step S217), and determines whether the counter value C2 has become a counter threshold C2th (Step S218). If the counter value C2 is not the counter threshold C2th (No at Step S218), the process returns to Step S213. If the counter value C2 becomes the counter threshold C2th (Yes at Step S218), the counter value C2 is reset (C2=0) (Step S219), the process returns to Step S211, and the wireless communication base station 2 returns to the reception standby state for the real-time data transmission request by the wireless communication device 10a. Instead of the processing from Step S217 to Step S219, when the notification of permitting real-time data transmission is not received after a predetermined time has elapsed from the real-time data transmission request, the process may return to Step S211, and the wireless communication base station 2 may return to the reception standby state for the real-time data transmission request by the wireless communication device 10a.

If the notification of permitting real-time data transmission from the wireless communication device 10b is received (Yes at Step S214), subsequently, the determination unit 267 of the wireless communication base station 2 determines whether the wireless communication device 10b is present within the transmission enabled range of the wireless communication base station 2 stored in the storage 23 (Step S215). If the wireless communication device 10b is not present within the transmission enabled range of the wireless communication base station 2 (No at Step S215), the process returns to Step S211, and the wireless communication base station 2 returns to the reception standby state for the real-time data transmission request by the wireless communication device 10a.

If the wireless communication device 10b is present within the transmission enabled range of the wireless communication base station 2 (Yes at Step S215), the communication controller 263 of the wireless communication base station 2 controls the communication unit 22 to give the notification of permitting real-time data transmission to the wireless communication device 10a (Step S216).

The following describes FIG. 7 again. The determination unit 170 of the wireless communication device 10a determines whether the notification of permitting real-time data transmission from the wireless communication base station 2 is received (Step S204). If the notification of permitting real-time data transmission from the wireless communication base station 2 is not received (No at Step S204), the determination unit 170 of the wireless communication device 10a adds 1 to a counter value C1 (Step S206), and determines whether the counter value C1 has become a counter threshold C1th (Step S207). If the counter value C1 is not the counter threshold C1th (No at Step S207), the process returns to Step S203. If the counter value C1 becomes the counter threshold C1th (Yes at Step S207), the determination unit 170 of the wireless communication device 10a resets the counter value C1 (C1=0) (Step S208), and determines that real-time data transmission cannot be performed (Step S202). Instead of the processing from Step S206 to Step S208, it may be determined that real-time transmission cannot be performed in a case in which the notification of permitting real-time data transmission is not received after a predetermined time has elapsed from the real-time data transmission request.

If the notification of permitting real-time data transmission is received from the wireless communication base station 2 (Yes at Step S204), the determination unit 170 of the wireless communication device 10a determines that real-time data transmission can be performed (Step S205).

The following describes FIG. 6 again. If it is determined that real-time data transmission can be performed at Step S2 (Step S205 in FIG. 7), the communication controller 163 of the wireless communication device 10a starts to transmit the real-time data from the communication unit 12 (Step S3). At this point, the output destination of the voice data collected by the microphone 17 (real-time data) is switched to the communication unit 12 by the voice data switching unit 168 of the wireless communication device 10a. Thereafter, when the transmission stopping operation is performed by the user by operating the operation unit 14 of the wireless communication device 10a (Step S4 in FIG. 6), the communication controller 163 of the wireless communication device 10a stops the transmission of the real-time data from the communication unit 12 (Step S5).

On the other hand, if it is determined that real-time data transmission cannot be performed at Step S2 (Step S202 in FIG. 7), the storage controller 164 of the wireless communication device 10a starts to record the voice data in the storage 13 (Step S6). At this point, the output destination of the voice data collected by the microphone 17 (real-time data) is switched to the storage 13 by the voice data switching unit 168 of the wireless communication device 10a. Thereafter, when the transmission stopping operation is performed by the user by operating the operation unit 14 of the wireless communication device 10a (Step S7), the storage controller 164 of the wireless communication device 10a stops the recording of the voice data into the storage 13 (Step S8).

<Process of Determining whether Voice Recording Data Transmission can be Performed>

Figure 10:
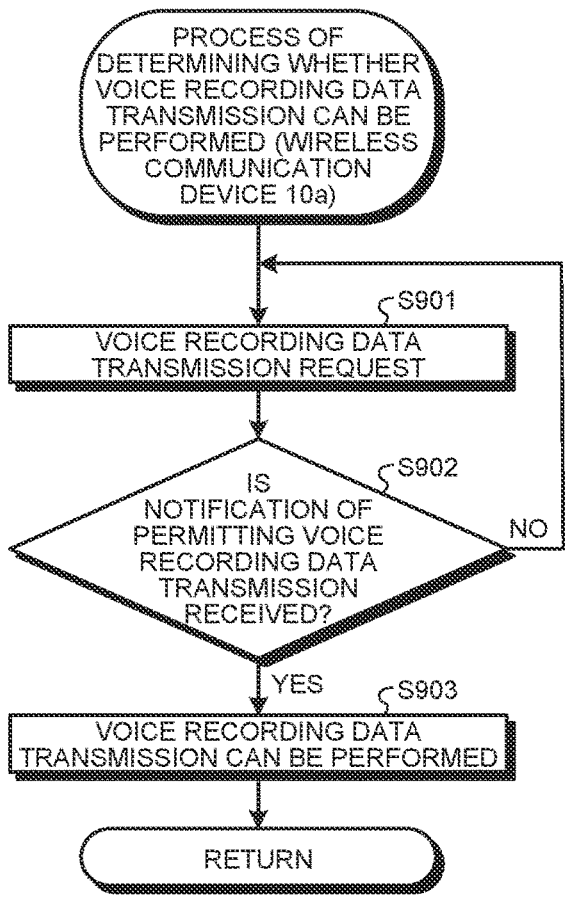
FIG. 10 is a flowchart illustrating an example of a procedure for a process of determining whether voice recording data transmission can be performed by the transmission side device.
Figure 11:
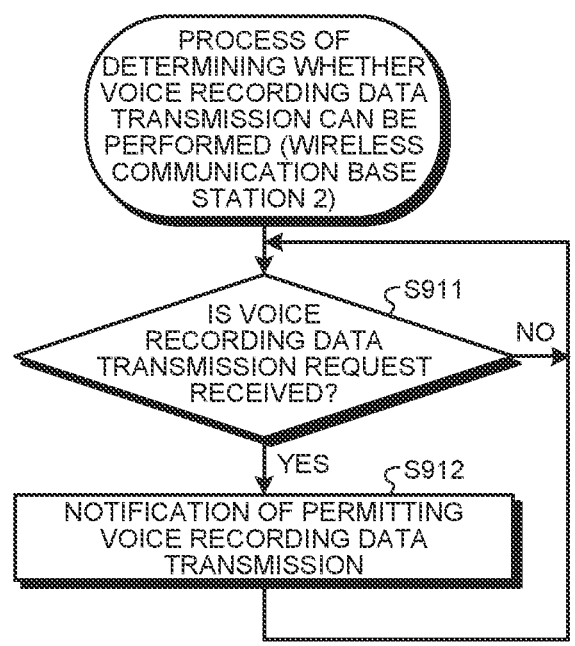
FIG. 11 is a flowchart illustrating an example of a procedure for a process of determining whether voice recording data transmission can be performed by the wireless communication base station.

With reference to FIG. 10 and FIG. 11, the following describes a specific example of the process of determining whether voice recording data transmission can be performed (Step S9 in FIG. 6) performed by the wireless communication device 10a as the transmission side device and the wireless communication base station 2. FIG. 10 is a flowchart illustrating an example of a procedure for the process of determining whether voice recording data transmission can be performed by the transmission side device. FIG. 11 is a flowchart illustrating an example of a procedure for the process of determining whether voice recording data transmission can be performed by the wireless communication base station.

In each of pieces of the process illustrated in FIG. 10 and FIG. 11, the wireless communication device 10a is assumed to be in a transmission standby state for the voice recording data, and the wireless communication base station 2 is assumed to be in a reception standby state for the voice recording data transmission request by the wireless communication device 10a.

After recording of the voice data into the storage 13 of the wireless communication device 10a as the transmission side device is stopped, the communication controller 163 of the wireless communication device 10a controls the communication unit 12 to make the voice recording data transmission request to the wireless communication base station 2 (Step S901). At the time of making the voice recording data transmission request to the wireless communication base station 2, the wireless communication device 10a may transmit the identification information such as the identification ID, the positional information, and the like thereof. The identification information such as the identification ID, the positional information, and the like thereof may be periodically transmitted. At the time when the wireless communication device 10a makes the voice recording data transmission request to the wireless communication base station 2, the determination unit 170 of the wireless communication device 10*a* may determine whether to make the voice recording data transmission request by the radio wave intensity between the wireless communication base station 2 and itself as an indicator of the determination. Alternatively, the determination unit 170 of the wireless communication device 10*a* may determine whether to make the voice recording data transmission request based on the positional information, a battery residual amount, an average value of a transmission arrival distance, and the like thereof.

As illustrated in FIG. 11, the determination unit 267 of the wireless communication base station 2 determines whether the voice recording data transmission request by the wireless communication device 10*a* is received (Step S911). If the voice recording data transmission request by the wireless communication device 10*a* is not received (No at Step S911), the determination unit 267 of the wireless communication base station 2 repeatedly performs the process at Step S911 until the voice recording data transmission request by the wireless communication device 10*a* is received.

If the voice recording data transmission request by the wireless communication device 10*a* is received (Yes at Step S911), the communication controller 263 of the wireless communication base station 2 controls the communication unit 22 to give the notification of permitting voice recording data transmission to the wireless communication device 10*a* (Step S912).

The following describes FIG. 10 again. The determination unit 170 of the wireless communication device 10*a* determines whether the notification of permitting voice recording data transmission from the wireless communication base station 2 is received (Step S902). If the notification of permitting voice recording data transmission from the wireless communication base station 2 is not received (No at Step S902), the process returns to Step S901, and the wireless communication device 10*a* returns to the transmission standby state for the voice recording data.

If the notification of permitting voice recording data transmission is received from the wireless communication base station 2 (Yes at Step S902), the determination unit 170 of the wireless communication device 10*a* determines that voice recording data transmission can be performed (Step S903).

The following describes FIG. 6 again. If it is determined that voice recording data transmission can be performed at Step S9 (Step S903 in FIG. 10), the process proceeds to the transmission process (Step S10) for the voice data (voice recording data) stored in the storage 13.

Figure 12:
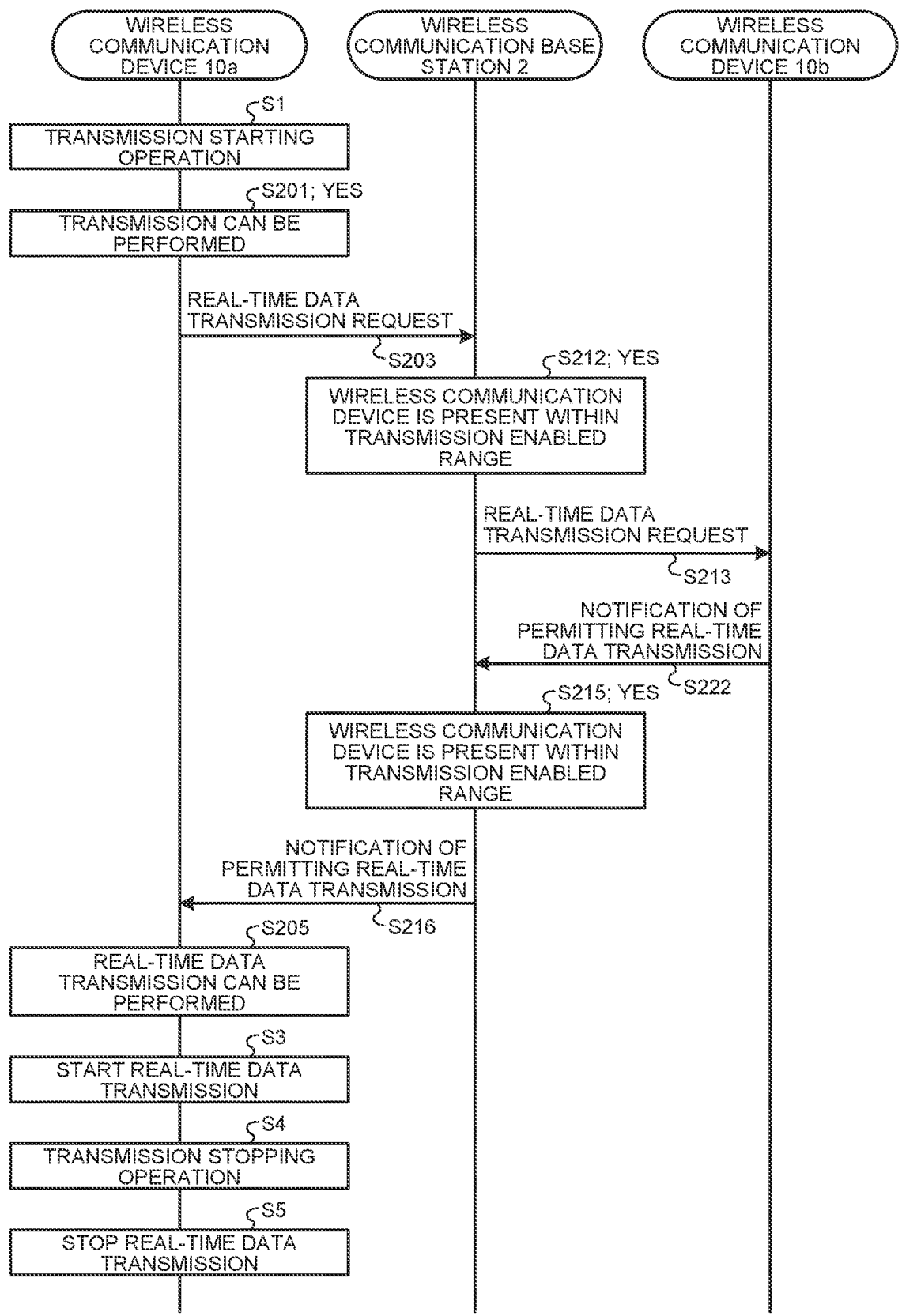
FIG. 12 is a sequence diagram illustrating a specific example of a process performed by the wireless communication system according to the first embodiment of the present application.
Figure 13:
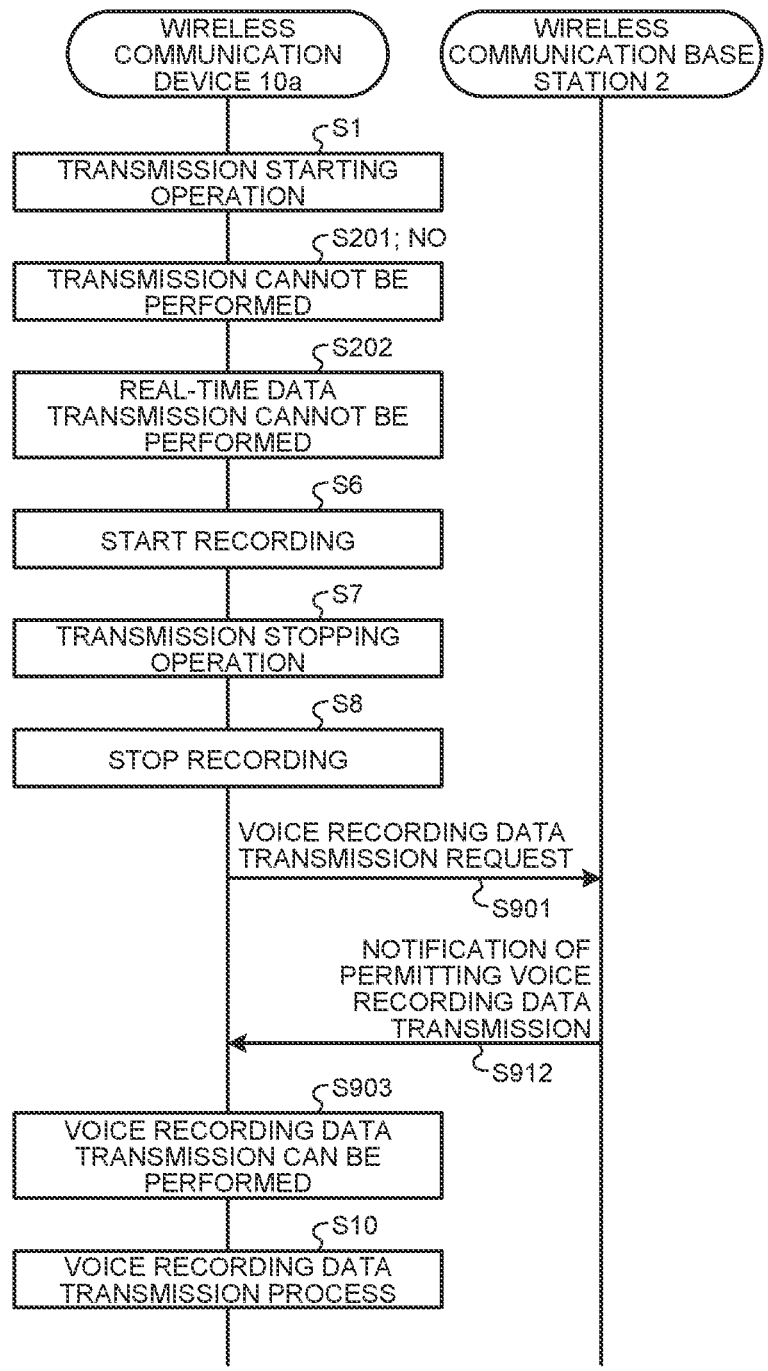
FIG. 13 is a sequence diagram illustrating a specific example of the process performed by the wireless communication system according to the first embodiment of the present application.

With reference to FIG. 12 and FIG. 13, the following describes a specific example of processes performed by the wireless communication system 1 according to the first embodiment of the present application. FIG. 12 and FIG. 13 are sequence diagrams illustrating a specific example of the processes performed by the wireless communication system according to the first embodiment of the present application.

As illustrated in FIG. 12, when the transmission starting operation is performed by the wireless communication device 10*a* (Step S1 in FIG. 6), in a case in which the wireless communication device 10*a* as the transmission side device can perform the transmission (Yes at Step S201 in FIG. 7) and is present within the transmission enabled range of the wireless communication base station 2 (Yes at Step S212 in FIG. 8), and the wireless communication device 10*b* as the reception side device is present within the transmission enabled range of the wireless communication base station 2 (Yes at Step S215 in FIG. 8), it is determined that the voice data (real-time data) collected by the microphone 17 can be transmitted (Step S205 in FIG. 7), and the real-time data is transmitted (Steps S3, S4, and S5 in FIG. 6). The real-time data transmission request (Step S203) corresponds to Step S203 in FIG. 8, the notification of permitting real-time data transmission (Step S222) corresponds to Step S222 in FIG. 9, and the notification of permitting real-time data transmission (Step S216) corresponds to Step S216 in FIG. 8.

For example, as illustrated in FIG. 13, when the transmission starting operation is performed by the wireless communication device 10*a* (Step S1 in FIG. 6), in a case in which the wireless communication device 10*a* as the transmission side device cannot perform transmission (No at Step S201 in FIG. 7), it is determined that the voice data (real-time data) collected by the microphone 17 cannot be transmitted (Step S202 in FIG. 7), the real-time data is recorded (S6, S7, and S8 in FIG. 6), and the voice recording data is transmitted to the wireless communication base station 2 (Step S10 in FIG. 6) after determining whether the voice recording data can be transmitted (Step S9 in FIG. 6). The voice recording data transmission request (Step S901) corresponds to Step S901 in FIG. 10, the notification of permitting voice recording data transmission (Step S912) corresponds to Step S902 in FIG. 10, and "the voice recording data transmission can be performed" (Step S903) corresponds to Step S903 in FIG. 10.

Similarly, when the wireless communication device 10*a* is not present within the transmission enabled range of the wireless communication base station 2 (No at Step S212 in FIG. 8), or when the wireless communication device 10*b* is not present within the transmission enabled range of the wireless communication base station 2 (No at Step S215 in FIG. 8), it is determined that the voice data (real-time data) collected by the microphone 17 cannot be transmitted (Step S202 in FIG. 7), the real-time data is recorded (S6, S7, and S8 in FIG. 6), and the voice recording data is transmitted to the wireless communication base station 2 (Step S10 in FIG. 6) after determining whether the voice recording data can be transmitted (Step S9 in FIG. 6).

Thus, for example, the voice data (real-time data) collected by the microphone 17 is recorded in a situation in which transmission is not actually started although the user performs the transmission starting operation, or transmission content is lost due to lowering of the radio wave intensity, the situation including a case in which the call channel is used by another group sharing the call channels (channel frequencies) with the group to which the wireless communication device 10 belongs, a case in which the wireless communication device 10*a* as the transmission side device is out of the transmission enabled range of the wireless communication base station 2, a case in which the wireless communication device 10*b* as the reception side device is out of the transmission enabled range of the wireless communication base station 2, or the like. The recorded voice data (voice recording data) is transmitted after determining whether the voice recording data can be transmitted.

<Voice Recording Data Transmission Process>

Figure 14:
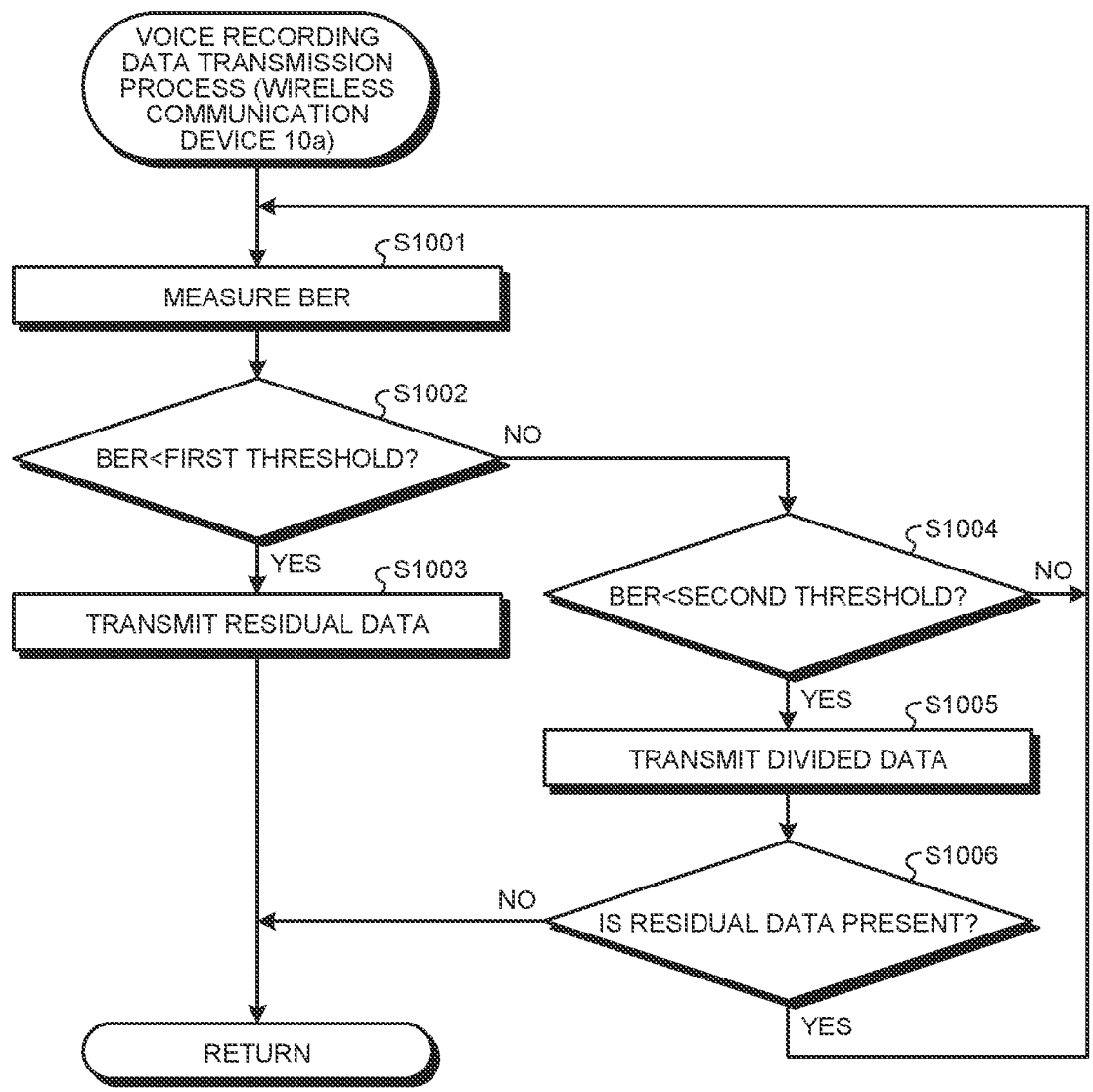
FIG. 14 is a flowchart illustrating an example of a procedure for a voice recording data transmission process performed by the transmission side device.

With reference to FIG. 14, the following describes a specific example of the voice recording data transmission process (Step S10 illustrated in FIG. 6) performed by the wireless communication device 10*a* as the transmission side device. FIG. 14 is a flowchart illustrating an example of a procedure for the voice recording data transmission process performed by the transmission side device.

In the voice recording data transmission process illustrated in FIG. 14, the output destination of the voice data (voice recording data) stored in the storage 13 is assumed to be switched to the communication unit 12 by the voice data switching unit 168 of the wireless communication device 10a.

At Step S9 illustrated in FIG. 6, after it is determined that voice recording data transmission can be performed (Step S903 in FIG. 10), the communication quality measuring unit 169 of the wireless communication device 10a measures the BER of the communication unit 12 (Step S1001).

The determination unit 170 of the wireless communication device 10a compares the BER measured by the communication quality measuring unit 169 with the first threshold stored in the storage 13. Specifically, the determination unit 170 of the wireless communication device 10a determines whether the BER measured by the communication quality measuring unit 169 is smaller than the first threshold (BER<first threshold) (Step S1002).

If the BER measured by the communication quality measuring unit 169 is equal to or larger than the first threshold (BER≥first threshold) (No at Step S1002), the determination unit 170 of the wireless communication device 10a determines whether the BER measured by the communication quality measuring unit 169 is smaller than the second threshold, which is larger than the first threshold (BER<second threshold) (Step S1004).

The BER measured by the communication quality measuring unit 169 is equal to or larger than the second threshold (BER≥second threshold) (No at Step S1004), the process returns to Step S1001.

If the BER measured by the communication quality measuring unit 169 is smaller than the second threshold (BER<second threshold) (Yes at Step S1004), the communication controller 163 of the wireless communication device 10a controls the communication unit 12 to transmit a piece of divided data having a predetermined length from a head of the voice data (voice recording data) stored in the storage 13 (Step S1005).

FIG. 15A is a schematic diagram of the voice recording data stored in the storage of the wireless communication device. FIG. 15B is a schematic diagram of the divided data illustrating a division example of the voice recording data transmitted from the communication unit of the wireless communication device. As illustrated in FIG. 15A, the voice data stored in the storage 13 of the wireless communication device 10 includes a start code ST added by the transmission starting operation and an end code ED added by the transmission stopping operation.

As illustrated in FIG. 15B, for example, an identifier such as identification information such as the identification ID and the positional information of the wireless communication device is added to the divided data transmitted at Step S1005.

The following describes FIG. 14 again. The determination unit 170 of the wireless communication device 10a determines whether residual voice recording data after the divided data is transmitted at Step S1005 is present (Step S1006). If the residual voice recording data after the divided data is transmitted at Step S1005 is present in the storage 13 (Yes at Step S1006), the process returns to Step S1001.

If the BER measured by the communication quality measuring unit 169 is smaller than the first threshold (BER<first threshold) (Yes at Step S1002), the communication controller 163 of the wireless communication device 10a controls the communication unit 12 to transmit the residual voice recording data after the divided data is transmitted at Step S1005 (Step S1003). When the BER that is firstly measured after the voice data is recorded in the storage 13 is smaller than the first threshold, the entire voice recording data may be transmitted without being divided.

If the BER measured by the communication quality measuring unit 169 is equal to or larger than the second threshold (BER≥second threshold) at Step S1004 of the voice recording data transmission processing illustrated in FIG. 14 (No at Step S1004), transmission processing for the voice recording data remaining in the storage 13 is temporarily stopped. Thereafter, when the BER measured by the communication quality measuring unit 169 becomes smaller than the second threshold (BER<second threshold) at Step S1004 of the voice recording data transmission processing illustrated in FIG. 14 (Yes at Step S1004), the transmission processing for the voice recording data remaining in the storage 13 is started again.

<Voice Recording Data Storage Process>

Figure 16:
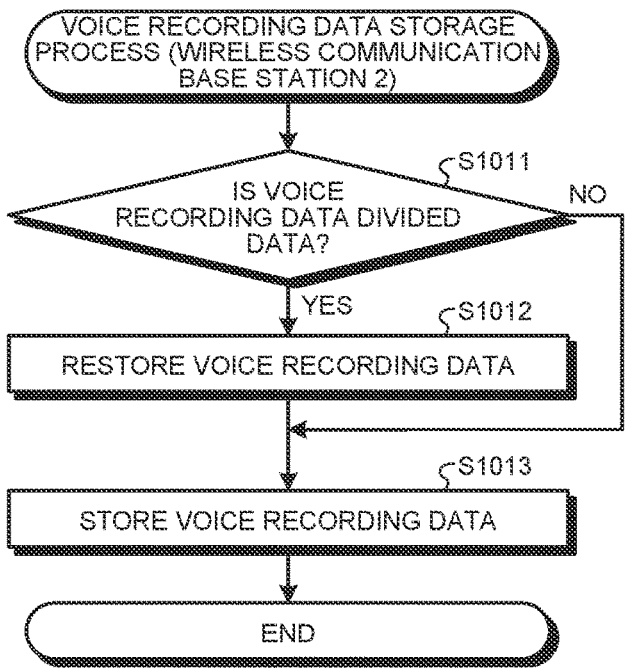
FIG. 16 is a flowchart illustrating an example of a procedure for a voice recording data storage process performed by the wireless communication base station.

With reference to FIG. 16, the following describes a specific example of the voice recording data storage process performed by the wireless communication base station 2. FIG. 16 is a flowchart illustrating an example of a procedure for the voice recording data storage process performed by the wireless communication base station.

The determination unit 267 of the wireless communication base station 2 determines whether the voice recording data is divided data, the voice recording data being transmitted from the wireless communication device 10a in the voice recording data transmission process illustrated in FIG. 14 and received by the communication unit 22 of the wireless communication base station 2 (Step S1011). Specifically, for example, the determination unit 267 of the wireless communication base station 2 determines whether the identifier is added to the data, and determines that the data is the divided data if the identifier is added to the data.

If the voice recording data received by the communication unit 22 of the wireless communication base station 2 is not the divided data (No at Step S1011), the storage controller 264 of the wireless communication base station 2 performs a control so that the voice recording data received by the communication unit 22 is stored in the storage 23 (Step S1013).

If the voice recording data received by the communication unit 22 is the divided data (Yes at Step S1011), the data restoration unit 268 of the wireless communication base station 2 successively combines pieces of the divided data received by the communication unit 22 on a time-series basis, and restores the original voice recording data before being divided in the voice recording data transmission processing illustrated in FIG. 14 (Step S1012). Specifically, for example, the data restoration unit 268 of the wireless communication base station 2 combines a series of pieces of the divided data on a time-series basis based on the identifier added to the divided data, and restores the original voice recording data before being divided in the voice recording data transmission process illustrated in FIG. 14. The storage controller 264 of the wireless communication base station 2 performs a control so that the voice recording data restored by the data restoration unit 268 is stored in the storage 23 (Step S1013).

<Voice Recording Data Relay Process>

Figure 17:
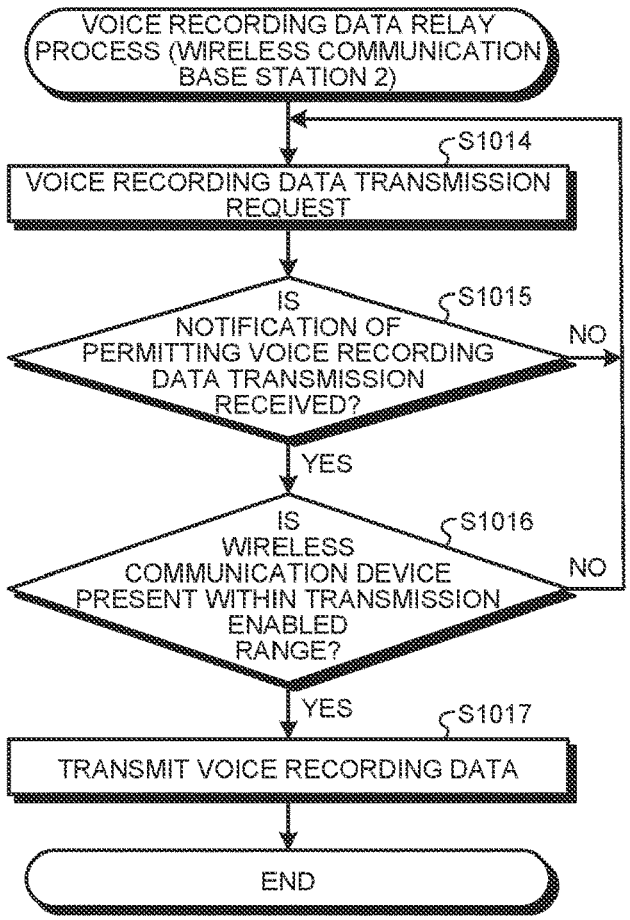
FIG. 17 is a flowchart illustrating an example of a procedure for a voice recording data relay process performed by the wireless communication base station.
Figure 18:
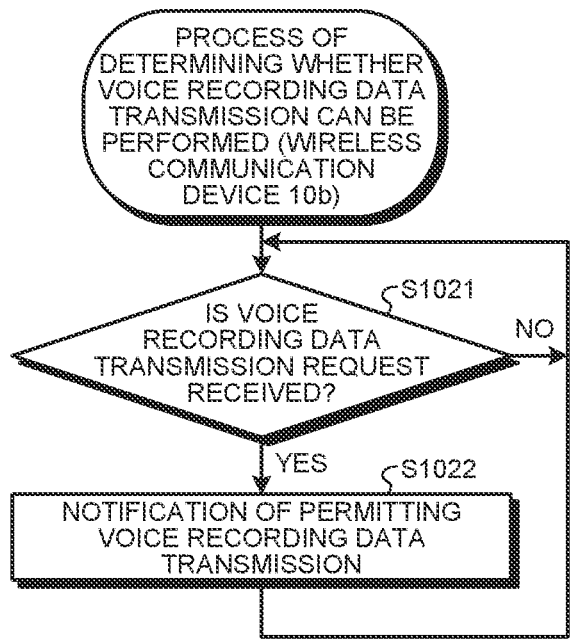
FIG. 18 is a flowchart illustrating an example of a procedure for a determination process of determining whether voice recording data transmission can be performed by the reception side device.

With reference to FIG. 17 and FIG. 18, the following describes specific examples of the voice recording data relay processes performed by the wireless communication base station 2, and the process of determining whether voice recording data transmission can be performed by the wireless communication device 10b as the reception side device. FIG. 17 is a flowchart illustrating an example of a procedure for the voice recording data relay process performed by the wireless communication base station. FIG. 18 is a flowchart illustrating an example of a procedure for the process of determining whether voice recording data transmission can be performed by the reception side device.

The communication controller 263 of the wireless communication base station 2 controls the communication unit 22 to make a voice recording data transmission request to the wireless communication device 10b as the reception side device (Step S1014). At the time of making the voice recording data transmission request to the wireless communication device 10b, the wireless communication base station 2 may also make a transmission request for the identification information such as the identification ID, the positional information, and the like thereof. At the time when the wireless communication base station 2 makes the voice recording data transmission request to the wireless communication device 10b, the determination unit 267 of the wireless communication base station 2 may determine whether to make the voice recording data transmission request by the radio wave intensity between the wireless communication device 10b and itself as an indicator of the determination. Alternatively, the determination unit 267 of the wireless communication base station 2 may determine whether to make the voice recording data transmission request based on the positional information, a battery residual amount, an average value of a transmission arrival distance, and the like thereof received from the wireless communication device 10b.

As illustrated in FIG. 18, the determination unit 170 of the wireless communication device 10b determines whether the voice recording data transmission request by the wireless communication base station 2 is received (Step S1021). If the voice recording data transmission request by the wireless communication base station 2 is not received (No at Step S1021), the determination unit 170 of the wireless communication device 10b repeatedly performs the process at Step S1021 until the voice recording data transmission request by the wireless communication base station 2 is received.

If the voice recording data transmission request by the wireless communication base station 2 is received (Yes at Step S1021), the communication controller 163 of the wireless communication device 10b controls the communication unit 12 to give the notification of permitting voice recording data transmission to the wireless communication base station 2 (Step S1022). At the time of giving the notification of permitting voice recording data transmission to the wireless communication base station 2, the wireless communication device 10b may transmit the identification information such as the identification ID, the positional information, and the like thereof. The identification information such as the identification ID, the positional information, and the like thereof may be periodically transmitted.

The following describes FIG. 17 again. The determination unit 267 of the wireless communication base station 2 determines whether the notification of permitting voice recording data transmission from the wireless communication device 10b is received (Step S1015). If the notification of permitting voice recording data transmission from the wireless communication device 10b is not received (No at Step S1015), the process returns to Step S1014.

If the notification of permitting voice recording data transmission from the wireless communication device 10b is received (Yes at Step S1015), subsequently, the determination unit 267 of the wireless communication base station 2 determines whether the wireless communication device 10b is present within the transmission enabled range of the wireless communication base station 2 stored in the storage 23 (Step S1016). If the wireless communication device 10b is not present within the transmission enabled range of the wireless communication base station 2 (No at Step S1016), the process returns to Step S1014.

If the wireless communication device 10b is present within the transmission enabled range of the wireless communication base station 2 (Yes at Step S1016), the communication controller 263 of the wireless communication base station 2 controls the communication unit 22 to transmit the voice recording data to the wireless communication device 10b (Step S1017).

Figure 19:
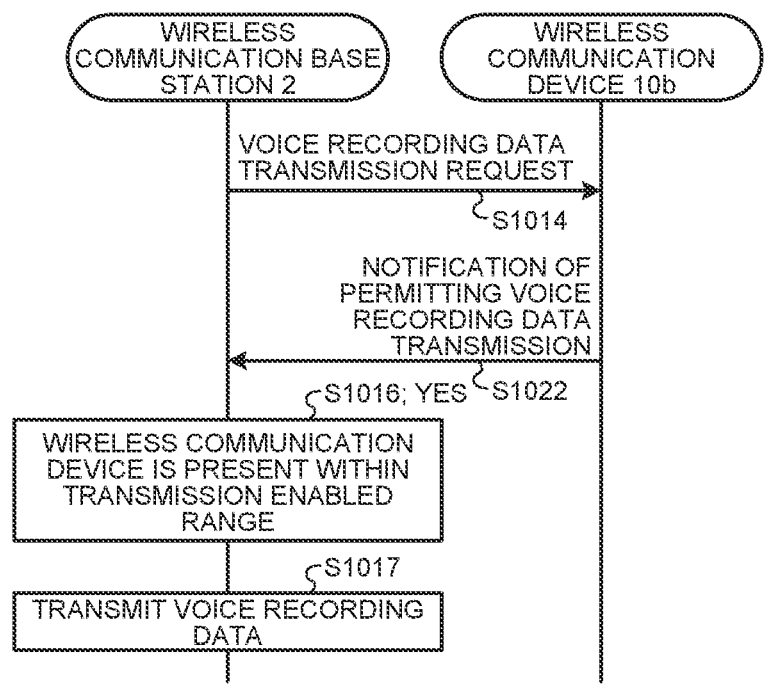
FIG. 19 is a sequence diagram illustrating a specific example of the process performed by the wireless communication system according to the first embodiment of the present application.

With reference to FIG. 19, the following describes a specific example of the process performed by the wireless communication system 1 according to the first embodiment of the present application. FIG. 19 is a sequence diagram illustrating a specific example of the process performed by the wireless communication system according to the first embodiment of the present application.

As illustrated in FIG. 19, when the wireless communication base station 2 makes the voice recording data transmission request to the wireless communication device 10b as the reception side device (Step S1014 in FIG. 17), if the wireless communication device 10b is present within the transmission enabled range of the wireless communication base station 2 (Yes at Step S1016 in FIG. 17), it is determined that the voice recording data can be transmitted, and the voice recording data is transmitted from the wireless communication base station 2 to the wireless communication device 10b (Step S1017 in FIG. 17).

On the other hand, if the wireless communication device 10b is not present within the transmission enabled range of the wireless communication base station 2 (No at Step S1016 in FIG. 17), it is determined that the voice recording data cannot be transmitted, and the voice recording data is not transmitted from the wireless communication base station 2 to the wireless communication device 10b.

Even when a favorable communication environment cannot be obtained, transmission content can be quickly transmitted through the respective processes including the process of determining whether real-time data transmission can be performed (FIG. 7, FIG. 8, and FIG. 9), the process of determining whether voice recording data transmission can be performed (FIG. 10 and FIG. 11), the voice recording data transmission process (FIG. 14), the voice recording data storage process (FIG. 16), and the voice recording data relay process (FIG. 17 and FIG. 18) described above in the first embodiment of the present application.

Modification of First Embodiment

In the first embodiment, at the time when the wireless communication device 10 starts to transmit the voice data, a real-time data transmission request is made in a case of the real-time data transmission, and the voice recording data transmission request is made in a case of the voice recording data transmission. In the present modification, a common voice data transmission request is made in both cases. Thus, in the wireless communication base station 2, the real-time data and the voice recording data may be collectively referred to as voice data.

The present modification is an example assuming that there is no other group sharing the call channels (channel frequencies) with the group to which the wireless communication device 10 belongs in the wireless communication system 1. That is, when the wireless communication device 10a as the transmission side device makes a transmission start request, it is determined that transmission cannot be performed in a case in which the wireless communication device 10a is out of the transmission enabled range of the wireless communication base station 2, and it is determined that transmission can be performed in a case in which the wireless communication device 10a is present within the transmission enabled range of the wireless communication base station 2. The present modification also assumes a case in which the wireless communication device 10b as the reception side device is present within the transmission enabled range of the wireless communication base station 2. Thus, this is a case in which transmission can be performed if the wireless communication device 10a is present within the transmission enabled range of the wireless communication base station 2, and transmission cannot be performed if the wireless communication device 10a is present outside thereof.

The following describes a specific example of processes performed by the wireless communication system 1 according to the present modification. Descriptions overlapping with those in the first embodiment will be omitted in some cases.

First, the following describes a case in which the wireless communication device 10a is present within the transmission enabled range of the wireless communication base station 2. When the transmission starting operation is performed by the wireless communication device 10a (Step S1), the wireless communication device 10a performs a process of determining whether the voice data collected by the microphone 17 can be transmitted (Step S2), and makes a voice data transmission request to the wireless communication base station 2 (Step S203) since it is determined that transmission can be performed (Yes at Step S201).

When receiving the voice data transmission request, the wireless communication base station 2 gives a notification of permitting voice data transmission to the wireless communication device 10a (Step S216) since the wireless communication device 10a is present within the transmission enabled range of the wireless communication base station 2 (Yes at Step S212), and the wireless communication device 10b is present within the transmission enabled range of the wireless communication base station 2 (Yes at Step S215) similarly to the first embodiment.

When receiving the notification of permitting voice data transmission from the wireless communication base station 2, the wireless communication device 10a starts real-time transmission of the voice data collected by the microphone 17 (Step S3). The wireless communication device 10a causes the voice data to include the positional information of the wireless communication device 10a that is acquired at the time when the real-time transmission is started.

The wireless communication base station 2 receives the voice data, and acquires the positional information included in the voice data. The wireless communication base station 2 determines whether the acquired positional information is within the transmission enabled range of the wireless communication base station 2. The acquired positional information is within the transmission enabled range, so that the wireless communication base station 2 transmits the voice data to the wireless communication device 10b.

Next, the following describes a case in which the wireless communication device 10a is present outside the transmission enabled range of the wireless communication base station 2. If transmission cannot be performed since the wireless communication device 10a is present outside the transmission enabled range of the wireless communication base station 2 (No at Step S201), recording of the voice data collected by the microphone 17 is started (Step S6). The wireless communication device 10a causes the voice recording data to include the positional information of the wireless communication device 10a at the time when recording of the voice data is started. The wireless communication device 10a measures the BER, and transmits the divided data in accordance with the BER similarly to the first embodiment. In a case of transmitting the voice recording data as the divided data, the identification information and the positional information are added to each piece of the divided data. Subsequently, the wireless communication device 10a transmits the voice recording data using the same method as that in the first embodiment.

The wireless communication base station 2 acquires the positional information included in the received voice data. The wireless communication base station 2 determines whether the acquired positional information is within the transmission enabled range of the wireless communication base station 2. The positional information added to the voice data is out of the transmission enabled range, so that it is determined that the received voice data is divided data (divided voice recording data). Subsequently, the wireless communication base station 2 successively receives pieces of the divided data using the same method as that in the first embodiment to restore the original voice recording data before being divided, and performs a relay process for the voice recording data.

According to the modification of the first embodiment, the wireless communication device 10 makes a common transmission request for real-time data transmission and voice recording data transmission, the wireless communication base station 2 receives the voice data of real-time data transmission and the voice data of voice recording data transmission bt a common transmission request, and whether the data is real-time data or voice recording data is determined based on the positional information in the voice data, so that the entire process performed by the communication system can be simplified.

Second Embodiment

<Wireless Communication System>

Figure 20:
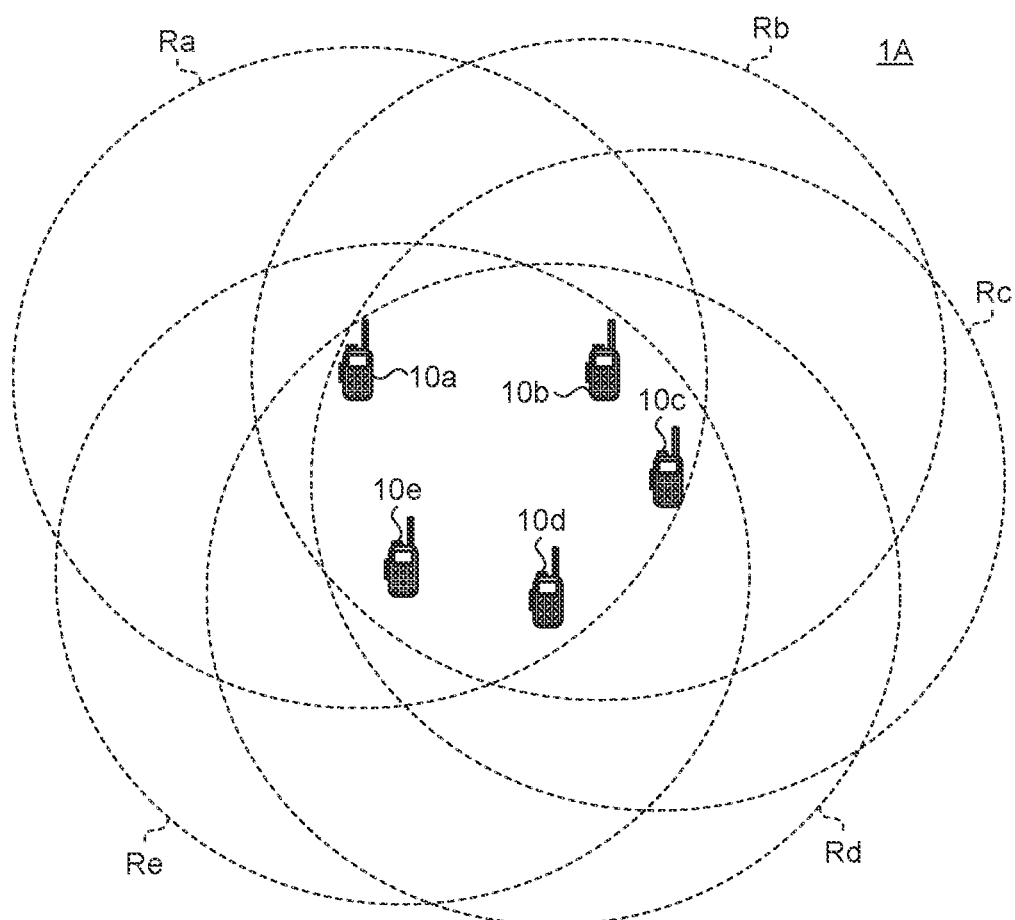
FIG. 20 is a conceptual diagram for explaining a configuration of a wireless communication system according to a second embodiment of the present application.

With reference to FIG. 20, the following describes a configuration of the wireless communication system according to a second embodiment of the present application. FIG. 20 is a conceptual diagram for explaining the configuration of the wireless communication system according to the second embodiment of the present application.

As illustrated in FIG. 20, a wireless communication system 1A according to the second embodiment of the present application includes, for example, the wireless communication device 10a, the wireless communication device 10b, the wireless communication device 10c, the wireless communication device 10d, and the wireless communication device 10e. Each of the wireless communication device 10a to the wireless communication device 10e belongs to the same group.

The wireless communication device 10a to the wireless communication device 10e perform group communication with each other by unidirectional communication of a Push to Talk (PTT) type. FIG. 20 illustrates an example in which the wireless communication device 10a to the wireless communication device 10e that perform group communication are present within each other's transmission enabled ranges Ra, Rb, Rc, Rd, and Re. In the second embodiment of the present application, each of the transmission enabled ranges Ra, Rb, Rc, Rd, and Re indicates a range in which a predetermined radio wave intensity required for performing stable transmission/reception between the respective wireless communication devices can be obtained.

The wireless communication device 10a to the wireless communication device 10e perform group communication while appropriately switching between the call channels (channel frequencies). The call channels (channel frequencies) used for performing the group communication by the wireless communication device 10a to the wireless communication device 10e are shared with another group that is different from the group to which the wireless communication device 10a to the wireless communication device 10e belong. Hereinafter, the wireless communication device 10a to the wireless communication device 10e may be collectively referred to as a wireless communication device 10A. The number of wireless communication devices 10A belonging to the same group is not limited.

<Wireless Communication Device>

Figure 21:
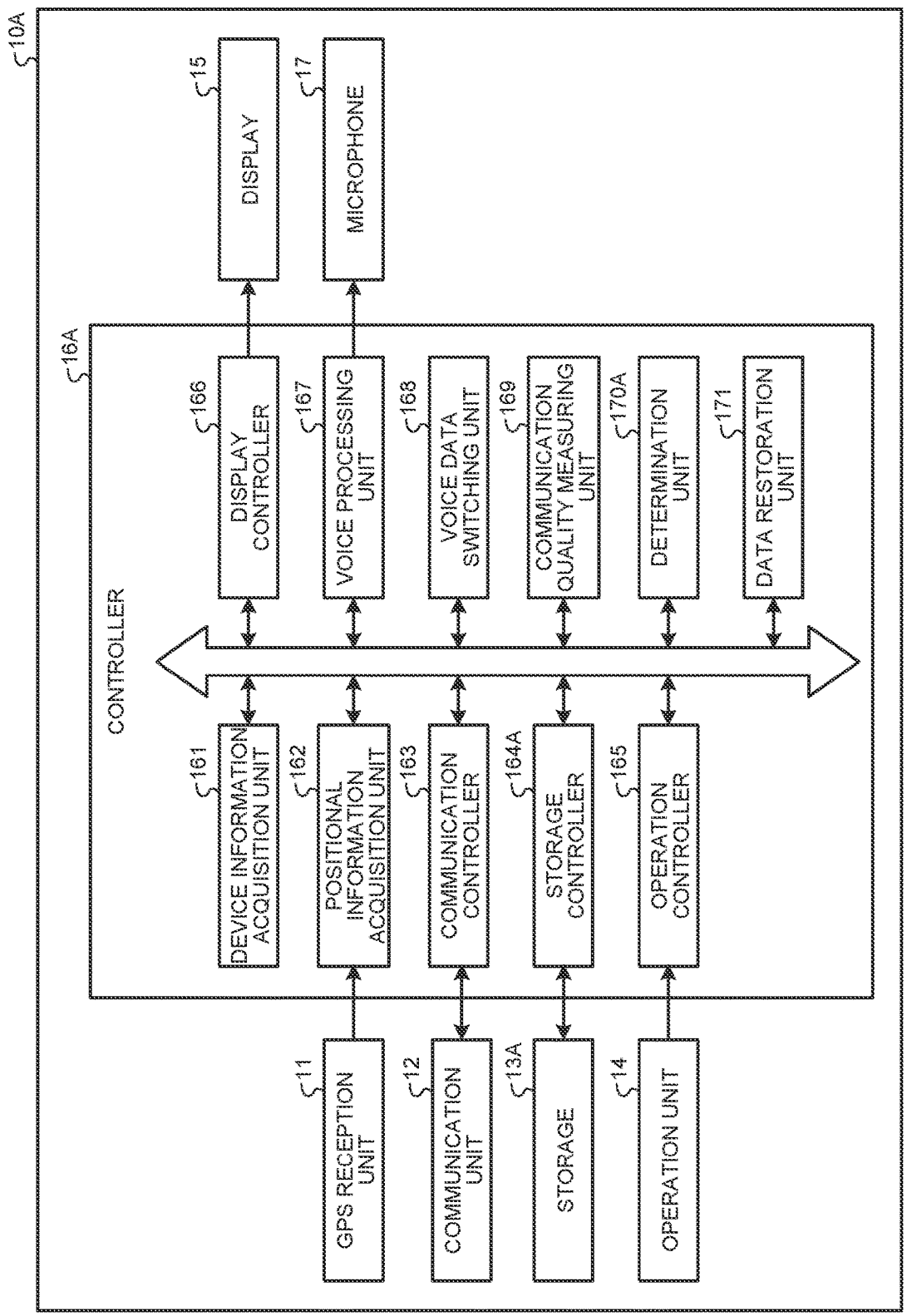
FIG. 21 is a block diagram illustrating an example of a configuration of a wireless communication device according to the second embodiment of the present application.

Next, with reference to FIG. 21, the following describes a configuration of the wireless communication device according to the second embodiment of the present application. FIG. 21 is a block diagram illustrating an example of the configuration of the wireless communication device according to the second embodiment of the present application.

As illustrated in FIG. 21, the wireless communication device 10A includes the GPS reception unit 11, the communication unit 12, a storage 13A, the operation unit 14, the display 15, a controller 16A, and the microphone 17. The wireless communication device 10A illustrated in FIG. 21 is a wireless communication device having a group communication function by unidirectional communication of PTT type. The GPS reception unit 11, the communication unit 12, the operation unit 14, the display 15, and the microphone 17 are the same constituent parts as those in the first embodiment, so that description thereof will not be repeated.

The storage 13A stores the voice data transmitted/received among the wireless communication devices in the group in addition to the function of the storage 13 of the wireless communication device 10 according to the first embodiment. The voice data transmitted/received among the wireless communication devices in the group is stored together with the positional information received from each of the wireless communication devices in the group by the communication unit 12. In the present application, the storage 13A stores the transmission enabled range of each of the wireless communication devices (for example, the transmission enabled ranges Ra, Rb, Rc, Rd, and Re illustrated in FIG. 20).

The controller 16A includes the device information acquisition unit 161, the positional information acquisition unit 162, the communication controller 163, a storage controller 164A, the operation controller 165, the display controller 166, the voice processing unit 167, the voice data switching unit 168, the communication quality measuring unit 169, a determination unit 170A, and a data restoration unit 171. The device information acquisition unit 161, the positional information acquisition unit 162, the communication controller 163, the operation controller 165, the display controller 166, the voice processing unit 167, the voice data switching unit 168, and the communication quality measuring unit 169 are the same constituent parts as those in the first embodiment, so that description thereof will not be repeated.

The storage controller 164A stores, in the storage 23, the voice data transmitted from each of the wireless communication devices in the group together with the positional information of each of the wireless communication devices, for example, in addition to the function of the storage controller 164 of the wireless communication device 10 according to the first embodiment.

The storage controller 164A also reads out the transmission enabled range of each of the wireless communication device stored in the storage 13A, for example, in addition to the function of the storage controller 164 of the wireless communication device 10 according to the first embodiment.

The determination unit 170A performs various kinds of determination processes in the wireless communication device 10A. Specifically, for example, the determination unit 170A determines whether each of the wireless communication devices in the group is present within the transmission enabled range of the device thereof (for example, the transmission enabled ranges Ra, Rb, Rc, Rd, and Re illustrated in FIG. 20). In the present application, for example, the determination unit 170A determines whether each of the wireless communication devices in the group is present within the transmission enabled range of the device thereof based on the transmission enabled range of the device thereof read out from the storage 13A and the positional information of each of the wireless communication devices in the group. Specific examples of the determination process performed by the determination unit 170A will be described later in detail in a process of determining whether real-time data transmission can be performed, a process of determining whether voice recording data transmission can be performed, a voice recording data transmission process, and a voice recording data relay process.

The data restoration unit 171 has a function equivalent to that of the data restoration unit 268 in the controller 26 of the wireless communication base station 2 according to the first embodiment. Specifically, when the voice data received by the communication unit 12 is divided into multiple pieces of divided data, the data restoration unit 171 combines the multiple pieces of divided data to restore the original voice data. Specific examples of the voice data restoration process performed by the data restoration unit 171 will be described later in detail in a voice recording data storage/reproduction process (described later).

Figure 22:
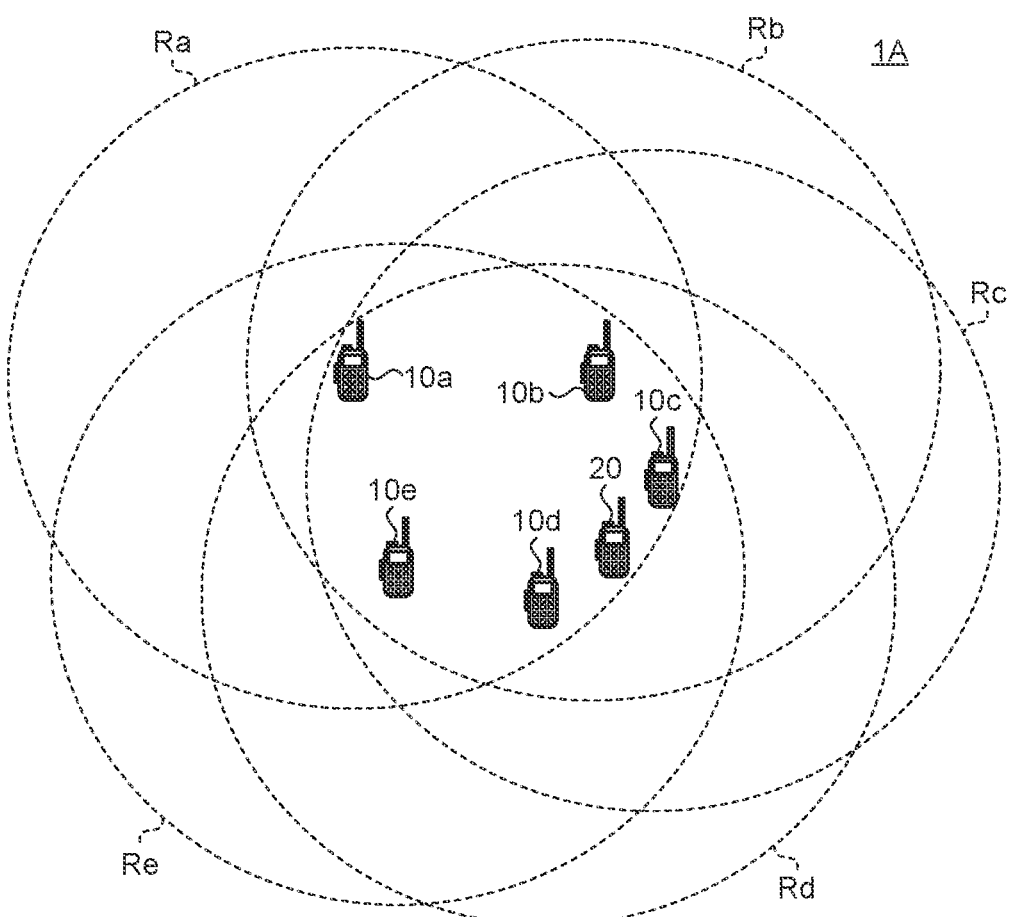
FIG. 22 is a conceptual diagram for explaining a specific example of the wireless communication system according to the second embodiment of the present application.
Figure 23:
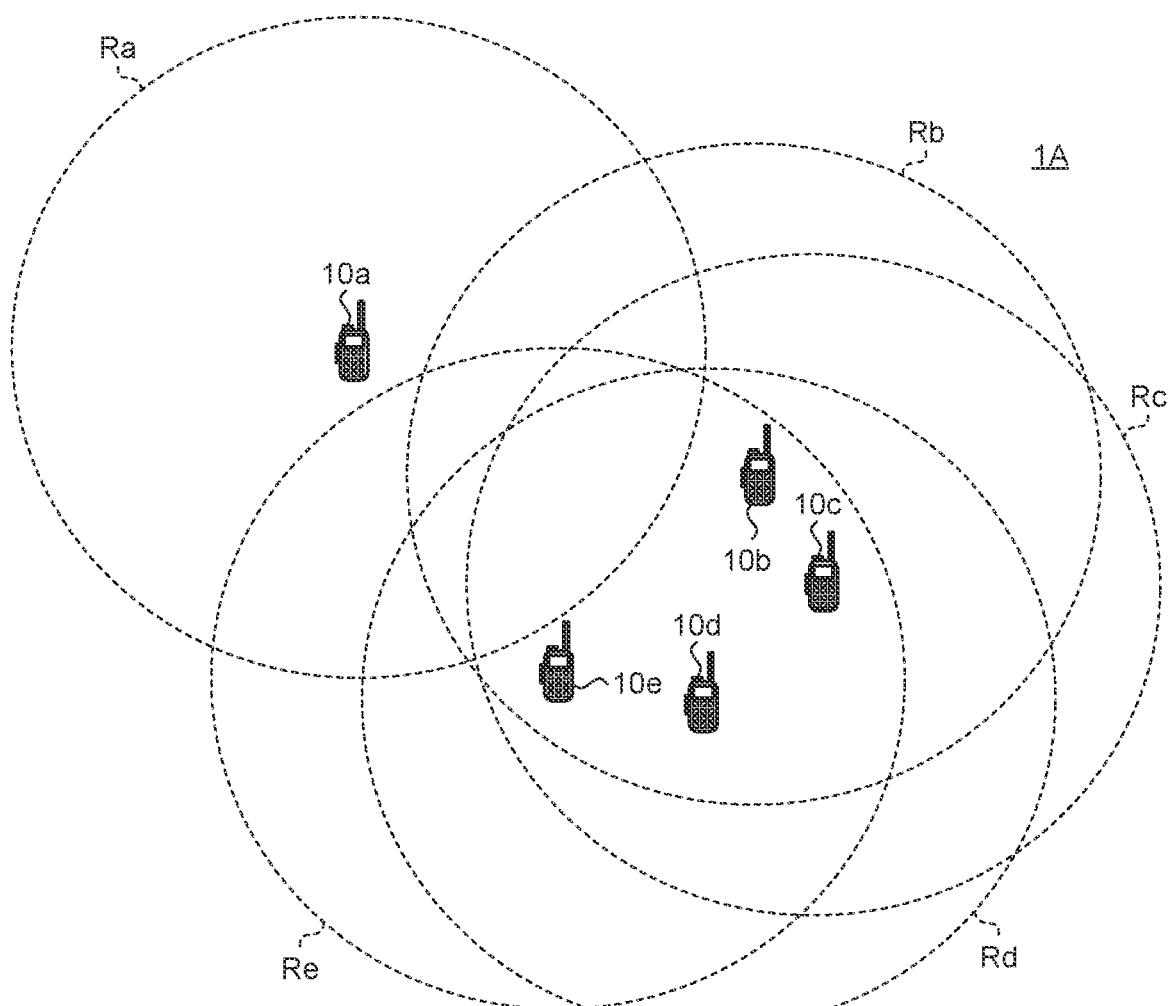
FIG. 23 is a conceptual diagram for explaining a specific example of the wireless communication system according to the second embodiment of the present application.

Next, with reference to FIG. 22 and FIG. 23, the following describes a specific example of the wireless communication system 1A according to the second embodiment of the present application. FIG. 22 and FIG. 23 are conceptual diagrams for explaining the specific example of the wireless communication system according to the second embodiment of the present application.

FIG. 22 illustrates an example in which a wireless communication device 20 belonging to another group different from the group of the wireless communication device 10A is present within the transmission enabled ranges Ra, Rb, Rc, Rd, and Re of the respective wireless communication devices. The number of the wireless communication devices 20 belonging to the same group is not limited.

FIG. 23 illustrates an example in which the wireless communication device 10a among the wireless communication devices 10A belonging to the same group that perform the group communication is present outside the transmission enabled ranges Rb, Rc, Rd, and Re of the respective wireless communication devices 10b, 10c, 10d, and 10e.

In the example illustrated in FIG. 22, for example, even when the user performs the transmission starting operation by the wireless communication device 10a, in a case in which there is no vacant channel in the call channels (channel frequencies) used for the group communication of the group to which the wireless communication device 10a belongs, that is, in a case in which all of the call channels (channel frequencies) shared with the group to which the wireless communication device 10a belongs are used for another group communication including the group to which the wireless communication device 20 belongs, transmission of the wireless communication device 10a by which the user has performed the transmission starting operation cannot be started until the group communication of the another group is completed and a vacant channel is generated in the call channels (channel frequencies).

In the example illustrated in FIG. 23, for example, in a case in which the user performs the transmission starting operation by the wireless communication device 10a that is present outside the transmission enabled ranges Rb, Rc, Rd, and Re of the respective wireless communication devices 10b, 10c, 10d, and 10e, there is a possibility that the radio wave intensity required for performing stable transmission/reception cannot be obtained and transmission content may be lost.

In this way, with the wireless communication device 10A that shares the call channels (channel frequencies) with another group and performs the group communication by unidirectional communication of PTT type, for example, there is a possibility that the transmission content cannot be quickly transmitted due to a time lag from when the user performs the transmission starting operation until a vacant channel is generated in the call channels (channel frequencies) and transmission is actually started, or due to lowering of the radio wave intensity caused when the wireless communication device 10A is present outside the transmission enabled ranges of the respective wireless communication devices, for example.

A schematic process performed by the wireless communication system 1A according to the second embodiment of the present application is the same as that in the first embodiment illustrated in FIG. 6, so that the description thereof will not be repeated. Also in the second embodiment, in the following description, the wireless communication device 10a is assumed to be the transmission side device (one wireless communication device), and the wireless communication device 10b is assumed to be the reception side device (another wireless communication device).

<Process of Determining Whether Real-Time Data Transmission can be Performed>

With reference to FIG. 24 and FIG. 25, the following describes specific examples of a process of determining whether real-time data transmission can be performed by the wireless communication device 10a as the transmission side device and the wireless communication device 10b as the reception side device (Step S2 illustrated in FIG. 6). FIG. 24 is a flowchart illustrating an example of a procedure for the process of determining whether real-time data transmission can be performed by the transmission side device. FIG. 25 is a flowchart illustrating an example of a procedure for the process of determining whether real-time data transmission can be performed by the reception side device.

In the processes illustrated in FIG. 24 and FIG. 25, the same process as that in the first embodiment is denoted by the same reference numeral. In each of the processes illustrated in FIG. 24 and FIG. 25, the wireless communication device 10a is assumed to be in a detection standby state for the transmission starting operation, and the wireless communication device 10b is assumed to be in a reception standby state for a real-time data transmission request by the wireless communication device 10a.

When the transmission starting operation is performed by the user by operating the operation unit 14 of the wireless communication device 10a (Step S1 in FIG. 6), first, the determination unit 170A of the wireless communication device 10a determines whether transmission can be performed by the communication unit 12 as illustrated in FIG. 24 (Step S201). Specifically, if there is no received radio wave in one of the call channels (one of the channel frequencies) stored in the storage 13A, the determination unit 170A of the wireless communication device 10a determines that transmission can be performed by using the one of the call channels (the one of the channel frequencies) (Yes at Step S201). If there are received radio waves in all of the call channels (channel frequencies) stored in the storage 13A, the determination unit 170A of the wireless communication device 10a determines that transmission cannot be performed (No at Step S201).

If transmission cannot be performed (No at Step S201), the determination unit 170 of the wireless communication device 10a determines that real-time data transmission cannot be performed (Step S202).

If transmission can be performed (Yes at Step S201), the communication controller 163 of the wireless communication device 10a controls the communication unit 12 to make a real-time data transmission request to the wireless communication device 10b (Step S203A). At the time of making the real-time data transmission request to the wireless communication device 10b, the wireless communication device 10a may transmit the positional information, the identification information such as the identification ID, and the like thereof. The identification information such as the identification ID, the positional information, and the like thereof may be periodically transmitted. At the time when the wireless communication device 10a makes the real-time data transmission request to the wireless communication device 10b, the determination unit 170A of the wireless communication device 10a may determine whether to make the real-time data transmission request by the wave intensity between the wireless communication device 10b and itself as an indicator of the determination. Alternatively, the determination unit 170A of the wireless communication device 10a may determine whether to make the real-time data transmission request based on the positional information, a battery residual amount, an average value of a transmission arrival distance, and the like thereof.

As illustrated in FIG. 25, the determination unit 170A of the wireless communication device 10b determines whether the real-time data transmission request by the wireless communication device 10a is received (Step S221A). If the real-time data transmission request by the wireless communication device 10a is not received (No at Step S221A), the determination unit 170A of the wireless communication device 10b repeatedly performs the process at Step S221A until the real-time data transmission request by the wireless communication device 10a is received.

If the real-time data transmission request by the wireless communication device 10a is received (Yes at Step S221A), subsequently, the determination unit 170A of the wireless communication device 10b determines whether the wireless communication device 10a is present within the transmission enabled range thereof stored in the storage 13A (Step S212A). If the wireless communication device 10a is not present within the transmission enabled range thereof (No at Step S212A), the process returns to Step S221A, and the wireless communication device 10b returns to the reception standby state for the real-time data transmission request by the wireless communication device 10a.

If the wireless communication device 10a is present within the transmission enabled range thereof (Yes at Step S212A), the communication controller 163 of the wireless communication device 10*b* controls the communication unit 12 to give the notification of permitting real-time data transmission to the wireless communication device 10*a* (Step S222A). At the time of giving the notification of permitting real-time data transmission to the wireless communication device 10*a*, the wireless communication device 10*b* may transmit the identification information such as the identification ID, the positional information, and the like thereof. The identification information such as the identification ID, the positional information, and the like thereof may be periodically transmitted.

The following describes FIG. 24 again. The determination unit 170A of the wireless communication device 10*a* determines whether the notification of permitting real-time data transmission from the wireless communication device 10*b* is received (Step S204A). If the notification of permitting real-time data transmission from the wireless communication device 10*b* is not received (No at Step S204A), the determination unit 170A of the wireless communication device 10*a* performs the process from Step S206 to Step S208. Instead of the process from Step S206 to Step S208, it may be determined that the real-time transmission cannot be performed in a case in which the notification of permitting real-time data transmission is not received after a predetermined time has elapsed from the real-time data transmission request.

If the notification of permitting real-time data transmission from the wireless communication device 10*b* is received (Yes at Step S204A), subsequently, the determination unit 170A of the wireless communication device 10*a* determines whether the wireless communication device 10*b* is present within the transmission enabled range thereof stored in the storage 13A (Step S215A). If the wireless communication device 10*b* is not present within the transmission enabled range thereof (No at Step S215), the process returns to Step S211, and the wireless communication device 10*b* returns to the reception standby state for the real-time data transmission request by the wireless communication device 10*a*.

If the wireless communication device 10*b* is present within the transmission enabled range thereof (Yes at Step S215A), the determination unit 170A of the wireless communication device 10*a* determines that real-time data transmission can be performed (Step S205).

The following describes FIG. 6 again. If it is determined that real-time data transmission can be performed at Step S2 (Step S205 in FIG. 7), the communication controller 163 of the wireless communication device 10*a* starts to transmit the real-time data from the communication unit 12 (Step S3). At this point, the output destination of the voice data collected by the microphone 17 (real-time data) is switched to the communication unit 12 by the voice data switching unit 168 of the wireless communication device 10*a*. Thereafter, when the transmission stopping operation is performed by the user by operating the operation unit 14 of the wireless communication device 10*a* (Step S4 in FIG. 6), the communication controller 163 of the wireless communication device 10*a* stops the transmission of the real-time data from the communication unit 12 (Step S5).

On the other hand, if it is determined that real-time data transmission cannot be performed at Step S2 (Step S202 in FIG. 24), the storage controller 164A of the wireless communication device 10*a* starts to record the voice data into the storage 13A (Step S6). At this point, the output destination of the voice data collected by the microphone 17 (real-time data) is switched to the storage 13A by the voice data switching unit 168 of the wireless communication device 10*a*. Thereafter, when the transmission stopping operation is performed by the user by operating the operation unit 14 of the wireless communication device 10*a* (Step S7), the storage controller 164A of the wireless communication device 10*a* stops the recording of the voice data into the storage 13A (Step S8).

<Process of Determining whether Voice Recording Data Transmission can be Performed>

Figure 27:
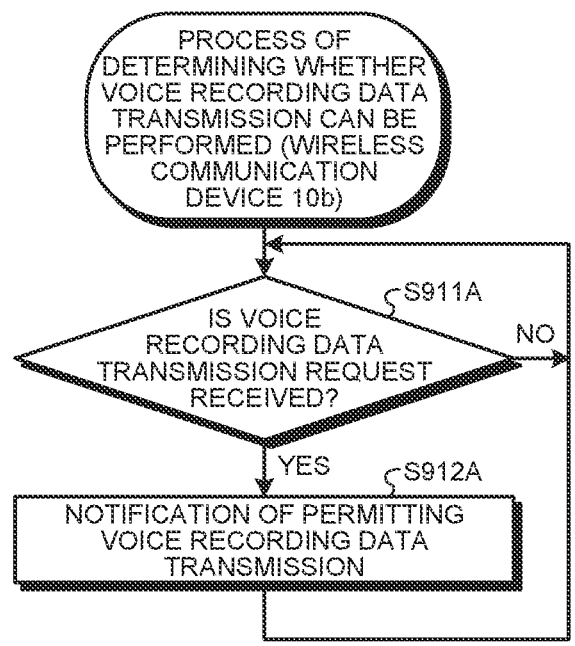
FIG. 27 is a flowchart illustrating an example of a procedure for a process of determining whether voice recording data transmission can be performed by the reception side device.

With reference to FIG. 26 and FIG. 27, the following describes specific examples of the processes of determining whether voice recording data transmission can be performed by the wireless communication device 10*a* as the transmission side device and the wireless communication device 10*b* as the reception side device (Step S9 illustrated in FIG. 6). FIG. 26 is a flowchart illustrating an example of a procedure for the process of determining whether voice recording data transmission can be performed by the transmission side device. FIG. 27 is a flowchart illustrating an example of a procedure for the process of determining whether voice recording data transmission can be performed by the reception side device.

In the processes illustrated in FIG. 26 and FIG. 27, the same process as that in the first embodiment is denoted by the same reference numeral. In each of the processes illustrated in FIG. 26 and FIG. 27, the wireless communication device 10*a* is assumed to be in the transmission standby state for the voice recording data, and the wireless communication device 10*b* is assumed to be in the reception standby state for the voice recording data transmission request by the wireless communication device 10*a*.

After recording of the voice data into the storage 13A of the wireless communication device 10*a* as the transmission side device is stopped, the communication controller 163 of the wireless communication device 10*a* controls the communication unit 12 to make a voice recording data transmission request to the wireless communication device 10*b* (Step S901A). At the time of making the voice recording data transmission request to the wireless communication device 10*b*, the wireless communication device 10*a* may transmit the identification information such as the identification ID, the positional information, and the like thereof. The identification information such as the identification ID, the positional information, and the like thereof may be periodically transmitted. At the time when the wireless communication device 10*a* makes the voice recording data transmission request to the wireless communication device 10*b*, the determination unit 170A of the wireless communication device 10*a* may determine whether to make the voice recording data transmission request by the radio wave intensity between the wireless communication device 10*b* and itself as an indicator of the determination. Alternatively, the determination unit 170A of the wireless communication device 10*a* may determine whether to make the voice recording data transmission request based on the positional information, a battery residual amount, an average value of a transmission arrival distance, and the like thereof.

As illustrated in FIG. 27, the determination unit 170A of the wireless communication device 10*b* determines whether the voice recording data transmission request by the wireless communication device 10*a* is received (Step S911A). If the voice recording data transmission request by the wireless communication device 10*a* is not received (No at Step S911A), the determination unit 170A of the wireless communication device 10*b* repeatedly performs the process at Step S911A until the voice recording data transmission request by the wireless communication device 10*a* is received.

If the voice recording data transmission request by the wireless communication device 10a is received (Yes at Step S911A), the communication controller 163 of the wireless communication device 10b controls the communication unit 22 to give the notification of permitting voice recording data transmission to the wireless communication device 10a (Step S912A).

The following describes FIG. 26 again. The determination unit 170A of the wireless communication device 10a determines whether the notification of permitting voice recording data transmission from the wireless communication device 10b is received (Step S902A). If the notification of permitting voice recording data transmission from the wireless communication device 10b is not received (No at Step S902A), the process returns to Step S901A, and the wireless communication device 10a returns to the transmission standby state for the voice recording data.

If the notification of permitting voice recording data transmission from the wireless communication device 10b is received (Yes at Step S902A), the determination unit 170A of the wireless communication device 10a determines that voice recording data transmission can be performed (Step S903).

The following describes FIG. 6 again. If it is determined that voice recording data transmission can be performed at Step S9 (Step S903 in FIG. 10), the process proceeds to the transmission process (Step S10) for the voice data (voice recording data) stored in the storage 13.

Figure 28:
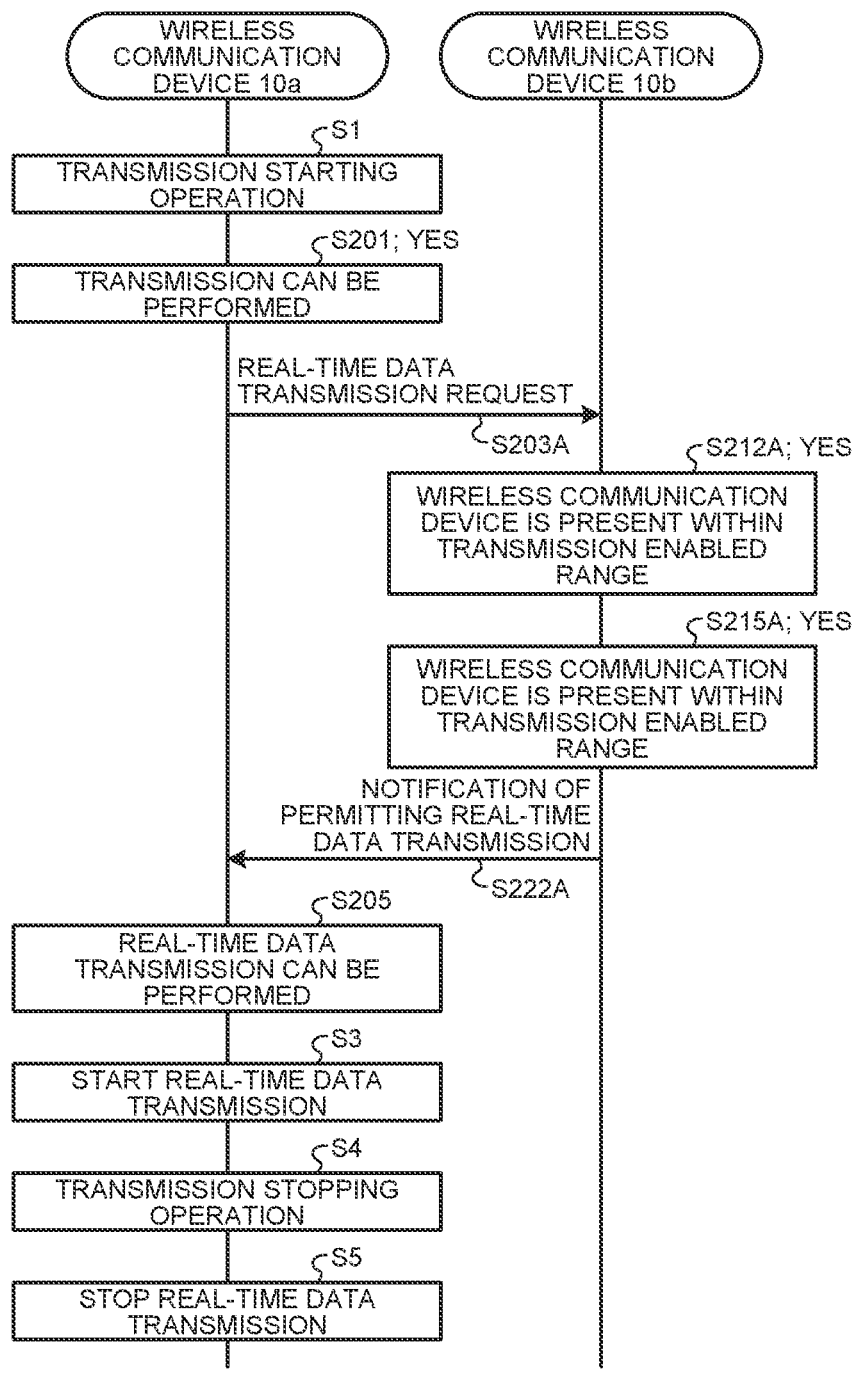
FIG. 28 is a sequence diagram illustrating a specific example of a process performed by the wireless communication system according to the second embodiment of the present application.

With reference to FIG. 28 and FIG. 29, the following describes a specific example of the process performed by the wireless communication system 1A according to the second embodiment of the present application. FIG. 28 and FIG. 29 are sequence diagrams illustrating a specific example of the process performed by the wireless communication system according to the second embodiment of the present application.

As illustrated in FIG. 28, when the transmission starting operation is performed by the wireless communication device 10a (Step S1 in FIG. 6), in a case in which the wireless communication device 10a as the transmission side device can perform the transmission (Yes at Step S201 in FIG. 24) and is present within the transmission enabled range of the wireless communication device 10b (Yes at Step S212A in FIG. 25), and in which the wireless communication device 10b as the reception side device is present within the transmission enabled range of the wireless communication device 10a (Yes at Step S215A in FIG. 24), it is determined that the voice data (real-time data) collected by the microphone 17 can be transmitted (Step S205 in FIG. 24), and the real-time data is transmitted (Steps S3, S4, and S5 in FIG. 6).

For example, as illustrated in FIG. 29, when the transmission starting operation is performed by the wireless communication device 10a (Step S1 in FIG. 6), in a case in which the wireless communication device 10a as the transmission side device cannot perform the transmission (No at Step S201 in FIG. 24), it is determined that the voice data (real-time data) collected by the microphone 17 cannot be transmitted (Step S202 in FIG. 24), the real-time data is recorded (S6, S7, and S8 in FIG. 6), and the voice recording data is transmitted to the wireless communication device 10b (Step S10 in FIG. 6) after determining whether the voice recording data can be transmitted (Step S9 in FIG. 6).

Similarly, in a case in which the wireless communication device 10a is not present within the transmission enabled range of the wireless communication device 10b (No at Step S212A in FIG. 25), or in a case in which the wireless communication device 10b is not present within the transmission enabled range of the wireless communication device 10a (No at Step S215A in FIG. 24), it is determined that the voice data (real-time data) collected by the microphone 17 cannot be transmitted (Step S202 in FIG. 24), the real-time data is recorded (S6, S7, and S8 in FIG. 6), and the voice recording data is transmitted to the wireless communication device 10b (Step S10 in FIG. 6) after determining whether the voice recording data can be transmitted (Step S9 in FIG. 6).

Thus, for example, the voice data (real-time data) collected by the microphone 17 is recorded in a situation in which transmission is not actually started although the user performs the transmission starting operation, or transmission content is lost due to lowering of the radio wave intensity, the situation including a case in which the call channel is used by another group sharing the call channel (channel frequency) with the group to which the wireless communication device 10 belongs, a case in which the wireless communication device 10a as the transmission side device is out of the transmission enabled range of the wireless communication device 10b as the reception side device, a case in which the wireless communication device 10b as the reception side device is out of the transmission enabled range of the wireless communication device 10a as the transmission side device, or the like. The recorded voice data (voice recording data) is transmitted after whether the voice recording data can be transmitted is determined.

<Voice Recording Data Transmission Process>

The voice recording data transmission process (Step S10 illustrated in FIG. 6) performed by the wireless communication device 10a as the transmission side device is the same process as that in the first embodiment illustrated in FIG. 14, so that the description thereof will not be repeated.

<Voice Recording Data Storage/Reproduction Process>

With reference to FIG. 30, the following describes a specific example of the voice recording data storage/reproduction processing performed by the wireless communication device 10b as the reception side device. FIG. 30 is a flowchart illustrating an example of a procedure for a voice recording data storage/reproduction process performed by the reception side device.

The determination unit 170A of the wireless communication device 10b determines whether the voice recording data is divided data, the voice recording data being transmitted from the wireless communication device 10a in the voice recording data transmission process illustrated in FIG. 14 and received by the communication unit 12 of the wireless communication device 10b (Step S1011A). Specifically, for example, the determination unit 170A of the wireless communication device 10b determines whether the identifier is added to the data, and determines that the data is divided data if the identifier is added to the data.

If the voice recording data received by the communication unit 12 of the wireless communication device 10b is not the divided data (No at Step S1011A), the determination unit 170A of the wireless communication device 10b performs a control so that the voice recording data received by the communication unit 22 is stored in the storage 13A (Step S1013A).

If the voice recording data received by the communication unit 12 is the divided data (Yes at Step S1011A), the data restoration unit 171 of the wireless communication device 10b successively combines pieces of the divided data received by the communication unit 12 on a time-series basis, and restores the original voice recording data before being divided in the voice recording data transmission process illustrated in FIG. 14 (Step S1012A). Specifically, for example, the data restoration unit 171 of the wireless communication device 10b combines a series of pieces of the divided data on a time-series basis based on the identifier added to the divided data, and restores the original voice recording data before being divided in the voice recording data transmission process illustrated in FIG. 14. The storage controller 164A of the wireless communication device 10b performs a control so that the voice recording data restored by the data restoration unit 171 is stored in the storage 13A (Step S1013A). Thereafter, the voice recording data stored in the storage 13A is reproduced by a speaker (not illustrated) (Step S1014).

Even when a favorable communication environment cannot be obtained, transmission content can be quickly transmitted through the respective processes including the process of determining whether real-time data transmission can be performed (FIG. 24 and FIG. 25), the process of determining whether voice recording data transmission can be performed (FIG. 26 and FIG. 27), the voice recording data transmission process (FIG. 14), and the voice recording data storage/reproduction process (FIG. 30) described above in the second embodiment of the present application.

According to the present application, even when a favorable communication environment cannot be obtained, transmission content can be transmitted quickly as much as possible.

The embodiments of the present application have been described above, but the present application is not limited to the content of the embodiments. The constituent elements described above encompass a constituent element easily conceivable by those skilled in the art, substantially the same constituent element, and what is called an equivalent. The constituent elements described above can also be appropriately combined with each other. In addition, the constituent elements can be variously omitted, replaced, or modified without departing from the gist of the embodiments described above.

What is claimed is:

1. A wireless communication device comprising:
   a communication unit configured to transmit and receive signals to and from another wireless communication device using a channel frequency;
   a storage configured to store at least voice data collected by a microphone;
   an operation unit configured to detect a transmission starting operation and a transmission stopping operation of the wireless communication device;
   a communication quality measuring unit configured to measure a bit error rate indicating quality of communication of the wireless communication device using the channel frequency for each predetermined period; and
   a controller configured to control at least the communication unit and the storage in accordance with the transmission starting operation of the wireless communication device and the transmission stopping operation of the wireless communication device, wherein
   the controller is further configured to;
   control the storage to store, in a case in which the operation unit detects the transmission starting operation of the wireless communication device when the channel frequency is used by other wireless communication devices, the voice data until the operation unit detects the transmission stopping operation of the wireless communication device,
   control the communication unit to transmit, in a case in which the bit error rate measured by the communication quality measuring unit is smaller than a first threshold when the channel frequency is not used by other wireless communication devices, all pieces of voice data that have not been transmitted of the voice data stored in the storage, and
   control the communication unit to transmit, in a case in which the bit error rate is equal to or larger than the first threshold and smaller than a second threshold when the channel frequency is not used by other wireless communication devices, the voice data that has a predetermined length and that is followed by head data of the voice data which has not been transmitted among a series of the voice data stored in the storage as divided data.

2. The wireless communication device according to claim 1, further comprising a position measuring unit configured to measure a current position thereof, wherein
   the controller is further configured to control, in a case in which the operation unit detects the transmission starting operation when the channel frequency is not used by other wireless communication devices, the storage to store the voice data until the operation unit detects the transmission stopping operation when the current position measured by the position measuring unit is out of a transmission enabled range of a wireless communication base station.

3. A wireless communication method comprising:
   storing voice data in a wireless communication device until a transmission stopping operation of the wireless communication device is detected after a transmission starting operation of the wireless communication device is detected when a channel frequency used for communication is used by other wireless communication devices;
   measuring a bit error rate indicating quality of communication of the wireless communication device using the channel frequency for each predetermined period;
   transmitting, in a case in which the bit error rate is smaller than a first threshold when the channel frequency is not used by other wireless communication devices, all pieces of voice data that have not been transmitted of the stored voice data; and
   transmitting, in a case in which the bit error rate is equal to or larger than the first threshold and smaller than a second threshold when the channel frequency is not used by other wireless communication devices, the voice data that has a predetermined length and that is followed by head data of the voice data that has not been transmitted among series of the stored voice data as divided data.

* * * * *